US010410179B2

(12) United States Patent
Pulnikova

(10) Patent No.: US 10,410,179 B2
(45) Date of Patent: Sep. 10, 2019

(54) SYSTEM AND METHOD OF GLOBAL ELECTRONIC JOB MARKET IN THE INTERNET

(71) Applicant: Valentina Pulnikova, Villingen-Schwenningen (DE)

(72) Inventor: Valentina Pulnikova, Villingen-Schwenningen (DE)

(73) Assignee: Pulnikova Valentina, Villingen-Schwenningen (DE)

(*) Notice: Subject to any disclaimer, the term of this patent is extended or adjusted under 35 U.S.C. 154(b) by 357 days.

(21) Appl. No.: 15/606,015

(22) Filed: May 26, 2017

(65) Prior Publication Data
US 2017/0262812 A1 Sep. 14, 2017

Related U.S. Application Data

(63) Continuation-in-part of application No. 12/821,495, filed on Jun. 23, 2010, now abandoned.

(51) Int. Cl.
G06Q 10/10 (2012.01)
G06Q 50/18 (2012.01)
(Continued)

(52) U.S. Cl.
CPC ......... G06Q 10/1053 (2013.01); G06F 16/21 (2019.01); G06Q 50/188 (2013.01); G06Q 30/08 (2013.01)

(58) Field of Classification Search
CPC .. G06Q 10/1053; G06Q 50/188; G06Q 30/08; G06F 16/21
See application file for complete search history.

(56) References Cited

U.S. PATENT DOCUMENTS 3,818,616 A * 6/1974 Weber .................. G09B 1/22
434/404
5,164,897 A * 11/1992 Clark .................. G06Q 10/1053
705/321

(Continued)

OTHER PUBLICATIONS

El sitio partners with JobShark to launch latin annerica's most sophisticated online employment and career development service. (Sep. 7, 2000). Business Wire Retrieved from http://dialog.proquest.conn/professional/docview/672295705?accountid=142257 (Year: 2000).*

Primary Examiner — Amanda C Abrahamson

(57) ABSTRACT

A system and a method of global electronic job market in the Internet are provided. The method of operating of a global electronic job market for jobseekers and employers via the Internet includes: registering the jobseekers and the employers; creation of the structured database of offers of employers and a database information about jobseekers on the basis of the International Classification of Specialities and on the basis of the International Classification of Job Positions; creation of requests of jobseekers for search of the necessary information in the database of offers of employers; creation of requests of employers for search of the necessary information in the database information about jobseekers; providing of searching of the necessary information according to requests, specified above, in appropriate databases; providing of jobseekers by the list of offers from employers, acceptable for them, which are available in the database; providing of employers by the list of offers from jobseekers, acceptable for them, which are available in the database; a choice of partners in employment out of the presented lists; holding competitions for job vacancies (tenders); conclusion of job contracts between jobseekers and employers; providing of additional services of the system of global electronic job market.

3 Claims, 20 Drawing Sheets

(51) Int. Cl.
*G06F 16/21* (2019.01)
*G06Q 30/08* (2012.01)

(56) References Cited

U.S. PATENT DOCUMENTS

| | | | | |
|---|---|---|---|---|
| 5,879,165 A * | 3/1999 | Brunkow | | G09B 7/04 |
| | | | | 434/322 |
| 6,266,659 B1 * | 7/2001 | Nadkarni | | G06Q 10/06 |
| | | | | 705/7.14 |
| 6,662,194 B1 * | 12/2003 | Joao | | G06Q 10/10 |
| | | | | 705/1.1 |
| 6,701,313 B1 * | 3/2004 | Smith | | G06F 16/289 |
| 7,424,438 B2 * | 9/2008 | Vianello | | G06Q 10/063112 |
| | | | | 705/7.14 |
| 8,296,318 B2 * | 10/2012 | Rieffanaugh, Jr. | | G06Q 10/06 |
| | | | | 707/769 |
| 8,527,510 B2 * | 9/2013 | Chen | | G06Q 10/1053 |
| | | | | 707/736 |
| 9,449,300 B2 * | 9/2016 | Kalscheuer | | G06Q 10/10 |
| 2002/0016823 A1 * | 2/2002 | Ueno | | H04L 51/063 |
| | | | | 709/206 |
| 2002/0103775 A1 * | 8/2002 | Quass | | G06N 20/00 |
| | | | | 706/12 |
| 2003/0182171 A1 * | 9/2003 | Vianello | | G06Q 10/06311 |
| | | | | 705/7.14 |
| 2004/0236598 A1 * | 11/2004 | Thomsen | | G06Q 10/10 |
| | | | | 705/321 |
| 2005/0149583 A1 * | 7/2005 | Baskaran | | G06F 16/219 |
| 2007/0225988 A1 * | 9/2007 | Bapat | | G06Q 10/1053 |
| | | | | 705/1.1 |
| 2008/0077570 A1 * | 3/2008 | Tang | | G06F 16/3344 |
| 2011/0231329 A1 * | 9/2011 | Vianello | | G01C 21/20 |
| | | | | 705/321 |

* cited by examiner

Table 1. Main kinds of people business

| Name of kind of people business | Code (Primary key) |
|---|---|
| Agriculture | 001 |
| Banking business | 002 |
| Education | 003 |
| Industry | 004 |
| . . . | . . . |
| ... | ... |

Table 2. Branches of kind of people business

| Name of branches of kind of people business | Code of kind of people business (Foreign key) | Code of branches (Primary key) |
|---|---|---|
| . . . | . . . | . . . |
| Building industry | 004 | 00k |
| Gas production | 004 | 00k+1 |
| Machine building | 004 | 00k+2 |
| Mining operation | 004 | 00k+3 |
| Oil production | 004 | 00k+4 |
| Power engineering | 004 | 00k+5 |
| . . . | . . . | . . . |
| ... | ... | ... |

Table N. Speciality

| Name of speciality | Code of kind of people business (Foreign key) | Code of branches (Foreign key) | ... | Code of qualification (Foreign key) | Code of speciality (Primary key) | Discription of speciality |
|---|---|---|---|---|---|---|
| . . . | . . . | . . . | . . . | | . . . | |
| Design of engines | 004 | 00k+2 | ... | 00qk | 00n | |
| Design of chassis | 004 | 00k+2 | ... | 00qk | 00n+1 | |
| Design of car bodies | 004 | 00k+2 | ... | 00qk | 00n+2 | |
| . . . | . . . | . . . | . . . | | . . . | |
| ... | ... | ... | ... | | ... | |

Fig. 2.

Table N+1. Qualifications of people

| Qualifications of people | Primary key |
|---|---|
|  |  |
| Designer of the first category | $00qk$ |
| Designer of the second category | $00qk+1$ |
| Designer of the third category | $00qk+2$ |
| Designer of the fourth category | $00qk+3$ |
|  |  |
| Mechanic of the first category | $00qm$ |
| Mechanic of the second category | $00qm+1$ |
| Mechanic of the third category | $00qm+2$ |
|  |  |
| ... | $00qp$ |

Fig. 3

Table 1. Main groups of job positions

| Name of groups of positions | Code (Primary key) |
|---|---|
| Managers | 001 |
| Specialists | 002 |
| Other Employee | 003 |
|  |  |
|  |  |
| . . . | . . . |
| ... | ... |

Table 2. Subgroups of job positions

| Name of subgroups of positions | Code of main groups of positions (Foreign key) | Code of subgroups (Primary key) |
|---|---|---|
| . . . | . . . | . . . |
| Upper manager | 001 | 00k |
| Middle manager | 001 | 00k+1 |
| Low level manager | 001 | 00k+2 |
|  |  |  |
| . . . | . . . | . . . |
| ... | ... | ... |

Table N. Job positions

| Name of positions | Code of main groups of positions (Foreign key) | Code subgroups of positions (Foreign key) | ... | Code of positions (Primary key) | Description of positions |
|---|---|---|---|---|---|
| . . . | . . . | . . . | . . . | . . . |  |
| Workshop chief | 001 | 00k+1 | ... | 00n |  |
| Head of department | 001 | 00k+1 | ... | 00n+1 |  |
| Head of service | 001 | 00k+1 | ... | 00n+2 |  |
|  |  |  |  |  |  |
| . . . | . . . | . . . | . . . | . . . |  |
| ... | ... | ... | ... | ... |  |

Fig. 4

| | |
|---|---|
| Your first name | 1 |
| Your family name | 2 |
| Your speciality according to ICS | 3 ▽ |
| Your qualification according to ICS | 4 ▽ |
| Your education level | 5 ▽ |
| Scientific degree | 6 ▽ |
| Your work experience | 7 ▽ |
| Knowledge of languages | 8 ▽ |
| Desired job position according to ICJP | 9 ▽ |
| Desired level of salary | 10 ▽ |
| Desired type of job | 11 ▽ |
| Your age | 12 ▽ |
| Your gender | 13 ▽ |
| Your groups of countries, country, region, city | 14 ▽ |
| Your CV | 15 |
| E-mail address | 16 |

Fig. 7

Table of information about jobseekers of database of information about jobseekers

| 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|
| № (Primary key) | First name | Family name | Speciality according to ICS | Qualification according to ICS | Education | Scientific degree | Work experience | Knowledge of languages | Desired job position according to ICJP | Desired salary | Desired type of job | Age | Gender | Groups of countries, country region city (Foreign keys) | CV | e-mail address |
| | | | (Foreign keys) | (Foreign key) | (Foreign key) | (Foreign key) | (Foreign key) | (Foreign keys) | (Foreign keys) | (Foreign key) | (Foreign key) | (Foreign key) | (Foreign key) | | | |
| 1 | | | ... | | | | | | ... | | | | | ... | | |
| 2 | | | | | | | | | | | | | | | | |
| 3 | | | | | | | | | | | | | | | | |
| 4 | | | | | | | | | | | | | | | | |
| 5 | | | | | | | | | | | | | | | | |
| 6 | | | | | | | | | | | | | | | | |
| ... | | | | | | | | | | | | | | | | |
| n | | | | | | | | | | | | | | | | |
| n+1 | | | | | | | | | | | | | | | | |

Fig. 8

| Company name | 1 |
| --- | --- |
| Company address | 2 |
| Offered (vacant) job position according to ICJP | 3 ▽ |
| Speciality of needed employee according to ICS | 4 ▽ |
| Qualification of needed employee according to ICS | 5 ▽ |
| Desired education level of candidate | 6 ▽ |
| Desired work experience | 7 ▽ |
| Scientific degree | 8 ▽ |
| Knowledge of languages | 9 ▽ |
| Offered level of salary | 10 ▽ |
| Type of job | 11 ▽ |
| Desired age | 12 ▽ |
| Desired gender | 13 ▽ |
| Groups of countries, country, region, city of offered job | 14 ▽ |
| Additional data about Company | 15 |
| Detailed description of offered job position and main demands to applicant | 16 |
| Additional benefits | 17 |

Fig. 9

Table of information about offers of employers of database of information about offers of employers

| 1 | 2 | 3 | 4 | 5 | 6 | 7 | 8 | 9 | 10 | 11 | 12 | 13 | 14 | 15 | 16 | 17... |
|---|---|---|---|---|---|---|---|---|---|---|---|---|---|---|---|---|
| № (Primary key) | Company name | Company address | Job position according to ICJP (Foreign keys) | Speciality according to ICS (Foreign keys) | Qualification according to ICS (Foreign key) | Work experience (Foreign key) | Desired educational level (Foreign key) | Scientific degree (Foreign key) | Knowledge of languages (Foreign keys) | Offered salary (Foreign key) | Type of work (Foreign key) | Desired age (Foreign key) | Desired gender (Foreign key) | Groups of countries, country region city (Foreign keys) | Additional data about Company | Detailed description of offered job position |
| 1 | | | | | | | | | | | | | | | | |
| 2 | | | | | | | | | | | | | | | | |
| 3 | | | | | | | | | | | | | | | | |
| 4 | | | | | | | | | | | | | | | | |
| 5 | | | | ... | | | | | | | | | | ... | | |
| 6 | | | | | | | | | | | | | | | | |
| ... | | | | | | | | | | | | | | | | |
| n | | | | | | | | | | | | | | | | |
| n+1 | | | | | | | | | | | | | | | | |

Fig. 10

Find job

Branch or sub-branch of kind of people activity or speciality according to ICS    1

Subgroup of job positions or desired job position according to ICJP    2

Groups of countries or country    3

Search

Fig. 11

Find employee

Branch or sub-branch of kind of people activity or speciality according to ICS    1

Subgroup of job positions or offered job position according to ICJP    2

Groups of countries or country    3

Search

Fig. 12

| № | Criterions of sorting | Switch on, switch off |
|---|---|---|
| 1 | Job position ▽ | ◎ |
| 2 | Country, region, city ▽ | ◎ |
| 3 | Qualification ▼ | ⦿ |
| 4 | Salary ▽ | ◎ |
| 5 | Work experience ▽ | ◎ |
| 6 | Type of job ▽ | ◎ |
| 7 | Education ▽ | ◎ |
| 8 | Scientific degree ▽ | ◎ |
| 9 | Knowledge of languages ▽ | ◎ |
| 10 | Age ▽ | ◎ |
| 11 | Gender ▽ | ◎ |

*Start*

Fig. 15

| № | Criterions of selecting | | Switch on, switch off | Priority |
|---|---|---|---|---|
| 1 | Job position | ▼ | ◉ | ▼ |
| 2 | Country, region, city | ▼ | ◉ | ▼ |
| 3 | Qualification | ▼ | ◉ | ▼ |
| 4 | Salary | ▼ | ◉ | ▼ |
| 5 | Work experience | ▽ | ◯ | ▽ |
| 6 | Type of job | ▼ | ◉ | ▼ |
| 7 | Education | ▼ | ◉ | ▼ |
| 8 | Scientific degree | ▼ | ◉ | ▼ |
| 9 | Knowledge of languages | ▽ | ◯ | ▽ |
| 10 | Age | ▽ | ◯ | ▽ |
| 11 | Gender | ▽ | ◯ | ▽ |

*Start*

Fig. 16

SYSTEM AND METHOD OF GLOBAL ELECTRONIC JOB MARKET IN THE INTERNET

CROSS-REFERENCE TO RELATED APPLICATIONS

This application is continuation in part of application Ser. No. 12/821,495 filed Jun. 23, 2010.

FIELD OF INVENTION

This invention relates to the electronic job market and in particular to the global electronic job market in the Internet.

BACKGROUND OF INVENTION

1. Description of the Related Art

At present the Internet has become one of the most popular ways for finding a job. There are many Web sites devoted to the problem of searching for a job, such as www.monster.com, www.jobsearch.co.uk, www.jobsearch.org, www.jobbankusa.com, www.jobserve.com, www.jobpilot.net and others.

Characteristic features of these Web sites are:

a possibility to fulfill search in general only by a jobseeker;

a very poor list of categories of employments;

searching on the basis of key words;

absence of a possibility of sorting search results and absence of a possibility of various selection of data from search results, these are mostly the national sites.

2. Problems

Analysis of patents and Web sites reveals the following main problems existing in the electronic job market.

The first problem is the absence of any classification of job positions and the absence of any classifications of specialities. A list of job positions on the basis of categories of employments does not allow creating a well-structured database of offers of employers or employees. Eventually, a search for a job on the basis of key words often gives unacceptable results.

Absence of complete structuring of the data does not allow to carry out the fast and qualitative search, a result of which completely satisfies the user.

Another problem is the absence of a possibility to conduct a sorting of search results and to conduct a selection of data from search results. Therefore, it is very difficult to find a needed result, if the large list of search results.

Another problem is the national rather than the global character of Web sites. It is impossible to get a global result on request. This is also one of impediments for the global job market.

Another problem is the absence of a developed transaction procedure within the system of the electronic job market, which includes a negotiation procedure and a procedure for concluding job contracts.

Another problem is the absence of a possibility of inserting formal data in a database for highly qualified jobseekers.

For solution of the specified problems, it is necessary to carry out structuring of the information arriving in system of an electronic job market from employers and from employees. First of all, it is necessary to structure the main data of a job market, namely: specialities of employees and their positions. For a global job market it is necessary to create the International Classification of Specialities and the International Classification of Job Positions. Besides, should be structured data including: an education, a work experience, a salary, a work place, knowledge of language etc. The system of an electronic job market should have a database with completely structured information. In the presence of the specified database, users can easily find the demanded information, and also to carry out necessary sorting and selection.

SUMMARY OF THE INVENTION

A system and a method of the global electronic job market in the Internet are proposed in this invention.

The system comprises a Web site or another network communication program, located on a host server, communication channels of the Internet and numerous computers of users. The users are jobseekers and employers, who are equitable participants of the process. The method of the operation of the global electronic job market includes a registration block, an information block, a block of search and selection of a partner on the job market, a block of competitions for job vacancies, a transaction block and a block of additional services of the system of the global job market.

After registration, jobseekers and employers provide their offers. On the basis of these offers a database of jobseekers and a database of employers are formed and stored on a host server. The databases are formed on the basis of the International Classification of Specialities (ICS) and the International Classification of Job Positions (ICJP). The database of jobseekers consists of two main parts. The first part of the database is formed on the basis of data obtained during the registration procedure. Another part of information about jobseekers is formed on the basis of data provided by jobseekers in the application form. These data include a name of a speciality, qualification according to ICS, a scientific degree, age, gender, a work experience, a place of residence, knowledge of languages, a required job position, according to ICJP, or a required work place, a desired salary (wage), a permanent or a temporary job is necessary, fulltime or part-time employment is necessary. Jobseekers also present a Curriculum Vitae (CV) in this database. The CV can contain all the additional information about him/her, which can be interesting for employers. The database of employers also consists of the two main parts. The first part of the database of employers is also formed on the basis of data obtained during the registration procedure. Another part of information about employers is additional information about themselves. This information includes a name of a Company or another legal entity, a country, a location address, an activity category, date of foundation of the Company, a number of employees, a photograph of a Company, a Company's Web site and so on. The second part of the database of employers includes offers of employers. This information is formed on the basis of data provided by employers in the application form. These data include the name of a speciality and qualification according to ICS, offered job position according to ICJP, or a work place, a scientific degree, knowledge of languages, age, gender, a work experience, a location of the offered job, an offered salary (wage), a permanent or a casual work offered, fulltime or part-time employment offered and additional characteristics of the speciality, suggested by the system.

Jobseekers and employers can access to these databases and conduct needed searching. Jobseekers implement searching with the aim to find a needed job. Employers carry out searching with the aim to find needed employees.

Jobseekers and employers can perform a different sorting of search results. Upon a request of a jobseeker or an employer, a selection of desired job positions or employees can be made. A result of selection becomes available to the user.

After analysis of the acquired information, the potential partners can negotiate in the frame of the system of the global electronic job market or outside it.

The jobseekers and employers can conclude a job contract either in the frame of the system or outside the system. If the job contract is concluded within the frame of the system a number of typical contracts are offered. The contract is stored in the database for a stipulated time.

Besides, the system of electronic job market offers holding a competition for job vacancies (tender).

The system of electronic job market offers additional services including a detailed help for working in the system with a number of examples, "Hot-line" with a consultation about the work of the system of electronic job market, juridical services dealing with problems of electronic job market, an analysis and prognosis of the job market, if required by Companies, other organizations and individuals, an analysis and prognosis of the a specific branch of the job market and a publication of the magazine with an analysis of the global electronic job market.

BRIEF DESCRIPTION OF THE DRAWINGS

The drawings, accompanying the detailed description of the invention, are the following:

FIG. 2 shows tables of Specialities of International Classification of Specialities in relational database.

FIG. 3 shows tables of Qualifications of International Classification of Specialities in relational database.

FIG. 4 shows tables of Positions of International Classification of Job Positions in relational database.

FIG. 7 shows the application form for creating of database of information about jobseekers.

FIG. 8 shows the structure of table of information about jobseekers of database of information about jobseekers.

FIG. 9 shows the application form for creating of database of information about offers of employers.

FIG. 10 shows the structure of table of information about offers of employers of database of information about offers of employers.

FIG. 11 shows the application form for preparation of request of jobseekers.

FIG. 12 shows the application form for preparation of request of employers.

FIG. 15 discloses the process of sorting of search result.

FIG. 16 discloses the process of selection of search result.

DETAILED DESCRIPTION

Under the term the "global electronic job market" we shall understand the international job market, which is realized with help of the Internet, because the Internet is the global device and is accessible to the majority of people of the planet.

Figure 1:
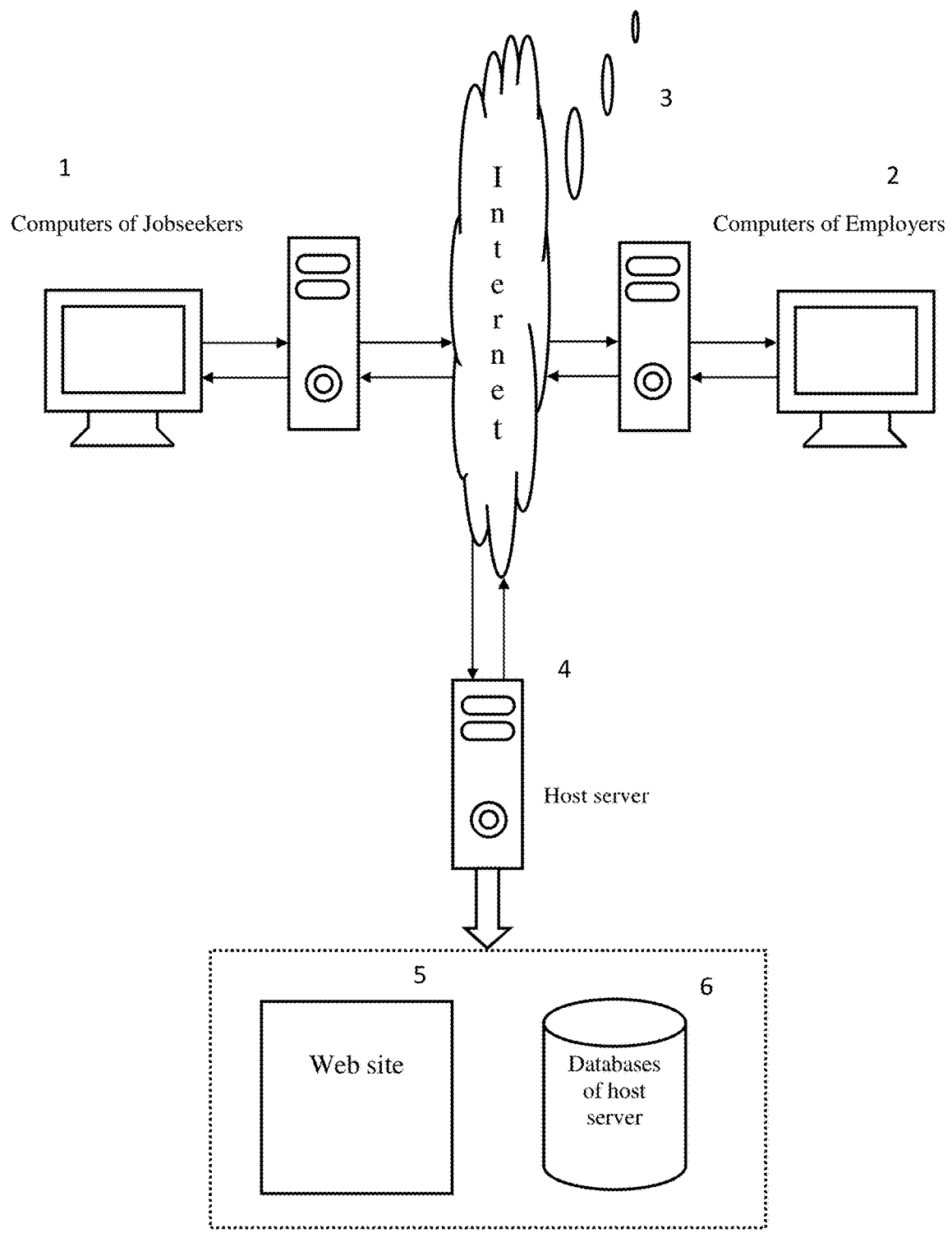
FIG. 1 is a principal scheme of the system of global job market.

The system of the global electronic job market for the users including employers and jobseekers (FIG. 1) includes computers of jobseekers (1) and the computers of employers (2), interacting by means of the Internet (3) with Web site (5), located on the host (main) server (4); a database located on the host (main) server (6), which includes the information about jobseekers, and the information about offers of employers. Besides, the database includes the International Classification of Specialities and the International Classification of Job Positions.

The system of the global electronic job market cannot function without the Internet, without computers of users and without the main server, where the Web site and the database of the system are located. The Internet provides communication between computers of users and the main server. By means of the computers users can enter the Web site of system of the global electronic job market to find work or to find the employee. The initial information for creation of databases of the information about jobseekers and information about offers of employers is formed by means of the Web site (FIG. 1) on computers of users. This information by means of Internet communication channels transfers to the main server and is stored in the database on disks of the main server. On the basis of requests of users take place a search and selection of the necessary information from the database of the main server. The received information by means of Internet communication channels transfers to computers of users.

Thus, the system of the global electronic job market represents the complex of the hardware, namely: the Internet, computers of users, the main server; and the Web site and the database. The primary goal of system of the global electronic job market is formation and storage of the information about jobseekers, and about offers of employers, transformation of this information according to requests of users, and transfer of the transformed information to users. To carry out the specified goal is possible only at presence both the Internet hardware and the Web site and the databases.

The database of main server includes the International Classification of Specialities. Under the term the "speciality" we shall understand a complex of knowledge, which were got by a special preparation and by a work experience; and a complex of the skills necessary for a certain kind of activity. Obviously that, any jobseeker on a job market wishes to find work first of all on the speciality, received in the course of learning process, or the speciality received as a result of a work experience. Any employer on a job market wishes to find the worker who has a speciality necessary for the employer. If the jobseeker and the employer specifies the same name of a speciality in their requests, the system of the global electronic job market according to this name of speciality name will easily and precisely relate them together. The big complexity consists in that the jobseeker and the employer have specified strictly same name of a speciality. For the decision of this problem and successful search in system of the global electronic job market the system should offer users the International Classification of Specialities. We shall understand under classification of specialities the systematized grouping of names of the specialities, based on their relation to certain branches (sub-branches) of economy.

Now such International classification does not exist. To create such International classification is possible. There is a wide experience on creation of classifications of specialities in the separate countries. In Russia it is used Classification of Specialities by education (The all-Russian Classificator of specialities by education. It is accepted and installed by the decision of Gosstandart of Russia from Sep. 30, 2003 No 276). Specialities-professions are confirmed by the Ministry of Labour of Russia (the All-Russian Classificator of professions of workers, positions of clerks and tariff categories on Jan. 1, 2000). The Classificator of specialities of a bachelor degree and magistracy of Republic Kazakhstan SC RK August 2004, the confirmed order of Committee on standardization, metrology and certification from Mar. 12, 2004 the order No 875 etc. There are other various classifications by work which are close to classification of specialities and can be used in its working out. In the USA the Dictionary of Occupational Titles is used. NOC (National Occupational Classification 2006) is available in Canada. There is International Standard Classification of Occupations etc.

Now the job market already became for a long time international. And last decades the international character of a job market only amplifies. If users specify names of specialities on the basis of documents on education, duty regulations and the other documents used in separate firms, in the separate countries, then a high probability exist, that different users of system call the same speciality differently. It is inadmissible for carrying out of electronic search, as it will be impossible to join the different names of specialities, specified by users. For the decision of this problem the system of the global electronic job market should unify available names of the same specialities in the different countries and to offer users the International Classification of Specialities where one accurate name will be given for each speciality. In this case unification is a reduction of available various names of any speciality to one. Certainly it not will be absolutely new names of specialities. Classification of specialities suitable for the international electronic job market can be originally created on one of languages (for example English), and then is translated on languages of participants of the international job market. For unequivocal interpretation of names of an each speciality the each speciality should have the short explanation opening its essence. In the specified classification the known names of specialities should be presented full enough, so that any user of system could find the name of speciality in classification, which is interesting to him. For search realisation in a global job market, users should take the speciality name only from the International Classification of Specialities presented by system. Classification of Specialities should be developing. With job market development certainly there will be new specialities, which will be necessary for entering in classification. The part of existing specialities in the future will simply disappear, and they will be necessary for withdrawing from classification.

It is clear, that for creation of the unified Classification of Specialities, suitable for the international electronic job market, serious efforts of certain collective of people are required. But nevertheless, the given classification is not something abstract and incomprehensible.

The International Classification of Specialities can be presented in a view of the graph (tree) where the basic branches of a tree represent main kinds of activity of the person, for example: the agriculture, banking, education, the industry, a science etc. Each main kind of activity of the person is subdivided into branches, for example branches of industries: building industry, the gas industry, mechanical engineering, mountain-mining industry, the petroleum-refining industry, power engineering etc. The branches of industries are subdivided on sub-branches, for example the mechanical engineering is subdivided on: the motor industry, machine-tool industry, shipbuilding, electromechanical engineering etc. At last final branches of a tree represent names of specialities, for example in motor industry, in section designing of cars: the designer of engines, the designer of the chassis, the designer of bodies of cars etc.

The International Classification of Specialities is placed in a database of the main server of the global electronic job market. It is necessary to realize the International Classification of Specialities in a relational database. Therefore the International Classification of Specialities will represent group of the related tables. The first table (FIG. 2) represents main kinds of people business (main kinds of activity of the person). In it are available two basic fields: the names of the main kind of people business and the codes of this main kind of people business, being a primary key. The names of main kind of people business are presented in a text format, and the codes of each main kind of people business, which are primary keys of this table, are presented in a digital format.

Branches of each kind of people business also are presented in the form of table 2 (FIG. 2). The basic fields represent names of branches of main kind of people business in a text kind, codes of branches of kind of people business, representing primary key, and a foreign key representing digital codes of main kind of people business from table 1. Last from tables (the Table N, FIG. 2) represents the table of specialities. In it, as well as in the previous tables, are available two basic fields: the name of a speciality and the code of a speciality representing a primary key. The speciality name is presented in a text format, and the code of each speciality is presented in a digital format. According to rules of relational databases, the primary key of any table of data is unique. This means that there can not be repeating codes of specialities in the table of specialities. Except the specified two fields at the table of specialities are present fields, the representing foreign keys related with all primary keys of all previous tables of the International Classification of Specialities, and a field in which the description of each speciality is presented in a text format. Thus, primary keys and foreign of all tables of the International Classification of Specialities are presented in form of digital codes.

Under the term the "qualification" we shall understand a level (degree) of readiness for work performance on this or that speciality. For example, qualification of the worker can be established in the form of the category or of the rank. Therefore except above listed tables the International Classification of Specialities contains the table of qualifications (FIG. 3). In the table of qualifications are available two basic fields: the name of qualifications and the code of qualification, which is a primary key. The table of specialities (FIG. 2) will have a foreign key, which is related with a primary key of the table of qualifications. Primary keys of the table of qualifications will be presented in form of digital codes also.

Tables of the International Classification of Specialities will be presented in various languages of participants of the global (international) electronic job market. At language switching on the main page of the Web site the International Classification of Specialities will be presented in the language chosen by the user.

For search realisation on the job market many jobseekers wish to specify a job position, which is required by him, and employers wish to specify offered job position.

Under the term the "job position" we shall understand a working place or an office place, connected with execution of certain official duties, which are stipulated in duty regulations. Specific targets, which solve on each workplace, are specified in duty regulations. The knowledge (education) necessary for performance of duties; the demanded speciality and qualification are specified also in duty regulations.

So, the "job position" is a working place, which a employee occupies, but the "speciality" is a body of knowledge and of skills, which are needed for successful fulfillment of duties at this working place. Therefore, the terms the "job position" and the "speciality" have fundamental difference.

Now there are in some countries classifications of job positions. So in Russia there is a Qualification directory of job positions of managers, experts and other employees (Approved by The decision of Ministry of Labor of the Russian Federation from Aug. 21, 1998 N 37) (with changes from January 21st, on Aug. 4, 2000, on Apr. 20, 2001); in Republic Kazakhstan the Qualification directory of job positions of managers of experts and other employees is developed (It is confirmed by the order of the Minister of Labour and Social Protection of population RK from Nov. 22, 2002 No the 273-p), etc.

The unified International Classification of Job Positions also is necessary for the International job market. In the various countries (and it is simple in various firms) there can be various names of the same job positions. In the International Classification of Job Positions, offered by the system of global electronic job market, for each job position there is only one unified name. In the specified classification the known names of job positions should be presented full enough, so that any user of system could find the name of job position in classification, of interest to him. For search realisation in a global job market users of system should use the names of job positions only specified in the International Classification of Job Positions of system. The International Classification of Job Positions suitable for the international electronic job market originally can be created also on one of languages (for example English), and then is translated on languages of participants of the International job market. For unequivocal interpretation of names of each job position the each job position should have the short explanation opening its essence. The International Classification of Job Positions should be developing.

The International Classification of Job Positions can be presented in a view of the graph (tree) where the basic branches of a tree represent the basic groups of job positions, for example: managers, specialists, other employees, etc. Each basic group of job positions is subdivided into subgroups, for example upper managers, middle managers, low level managers etc. At last final branches of a tree represent job positions, for example for middle managers: the workshop chief, the head of department, the head of service etc. In system of a global electronic job market the International Classification of Job Positions is placed in a database of the main server. The International Classification of Job Positions is realized in a relational database. Therefore, as well as in the previous case, the International Classification of Job Positions will represent group of the related tables. The first table (FIG. 4) represents the main groups of job positions. In it are available two basic fields: the name of the basic groups of job positions and the code of these groups, which is a primary key. The names of the basic groups of job positions are presented in a text format, and the codes of each group are presented in a digital format.

Subgroups of the basic job positions also are presented in the form of table 2 (FIG. 4). The basic fields represent names of subgroups of job positions in a text format, a code of subgroups of the job positions, a representing primary key, and the foreign key representing digital code of the basic groups of job positions from table 1. Last from tables (the Table N, FIG. 4) represents the table of job positions. In it, as well as in the previous tables, are available two basic fields: the name of a job position and the code of a job position representing a primary key. The job position name is presented in a text format, and the code of each job position is presented in a digital format. As well as in the previous case in the table of job positions there can not be repeating codes of job positions. Except the specified two fields at the table of job positions are present fields, the representing foreign keys, related with all primary keys of all previous tables of the International Classification of Job Positions, and a field in which the description of each job position is presented in a text format. Thus, primary keys and foreign of all tables of the International Classification of Job Positions are presented in form of digital codes.

Thus, the system of global electronic job market in the Internet intends for searching of job vacancies by jobseekers and for searching of employees by employers and represents a complex of hardware and software. The system of global electronic job market comprises a host server, which, in turn, comprises: a Web site of the system of global electronic job market, with programs of searching, with help of which jobseekers can search of job vacancies, and employers can search of employees, and physical media of storage of information, where databases of the system of global electronic job market are stored. The databases at least comprise: a group of related data tables representing an International Classification of Specialities; a group of related data tables representing an International Classification of Job Positions; a relational database containing information about jobseekers, which represents a group of related tables of data, where a group of fields, in which information about specialities is contained, represents foreign keys, related with primary keys of all tables of the International Classification of Specialities, and where a group of fields, in which information about job positions is contained, represents foreign keys, related with primary keys of all tables of the International Classification of Job Positions; a relational database containing information about offers of employers, which represents a group of related tables of data, where a group of fields, in which information about specialities is contained, represents foreign keys, related with primary keys of all tables of the International Classification of Specialities, and where a group of fields, in which information about job positions is contained, represents foreign keys, related with primary keys of all tables of the International Classification of Job Positions. The host server of the system of global electronic job market connects with numerous computers of jobseekers and with numerous computers of employers by means of the Internet, and the system of global electronic job market communicates with these computers with help of the Web site of the host server of the system of global electronic job market and with help of the Internet.

Figure 5:
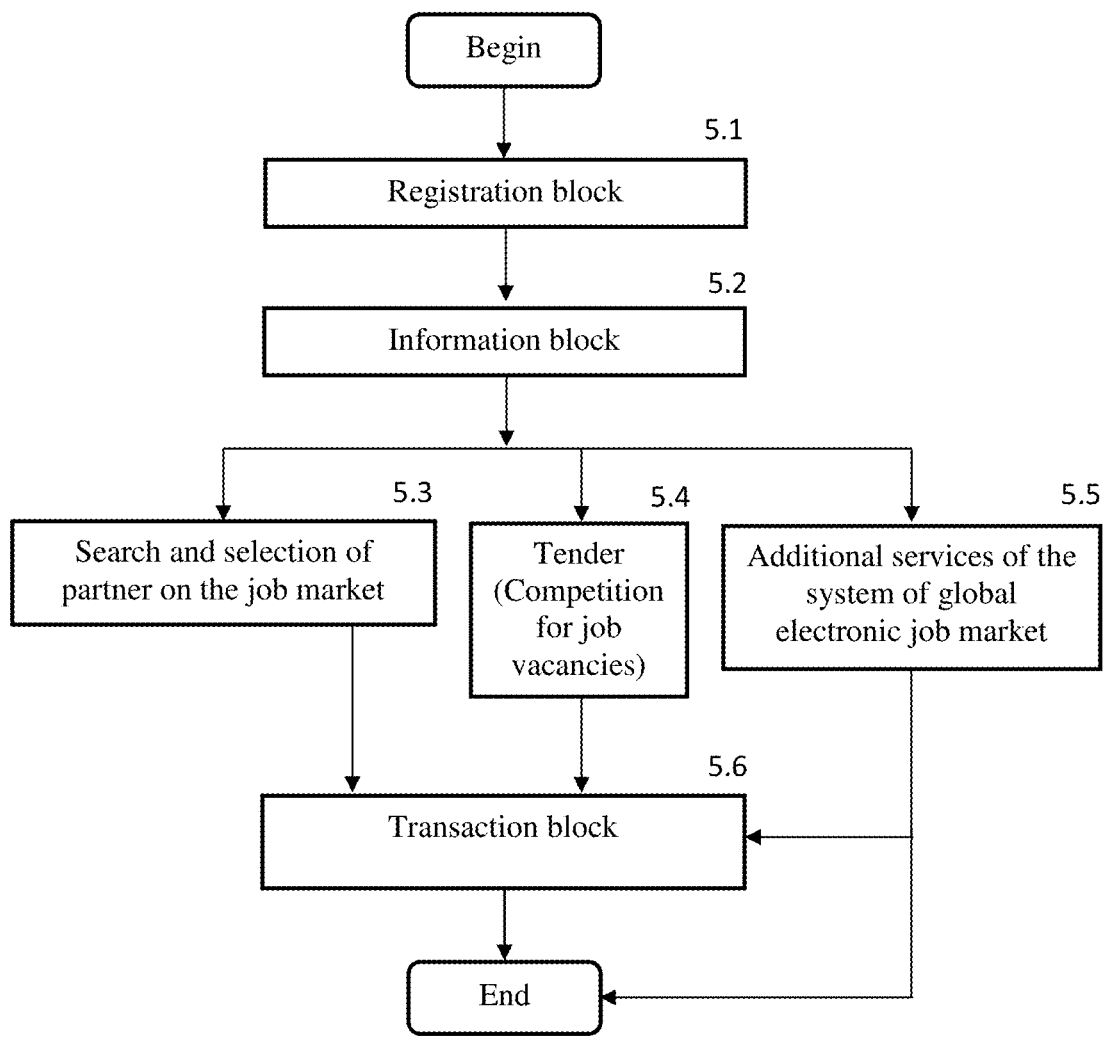
FIG. 5 is a principal scheme of the method of operation of global job market.

According to the invention, a method of operation of the global electronic job market (FIG. 5) includes a registration block (5.1), an information block (5.2), a block of search and selection of a partner on the job market (5.3), a block of competitions for job vacancies (5.4), a transaction block (5.6) and a block of additional services of the system of global job market (5.5). The method of operating of the system of global electronic job market is intended for searching of job vacancies by jobseekers and for searching of employees by employers.

Figure 6:
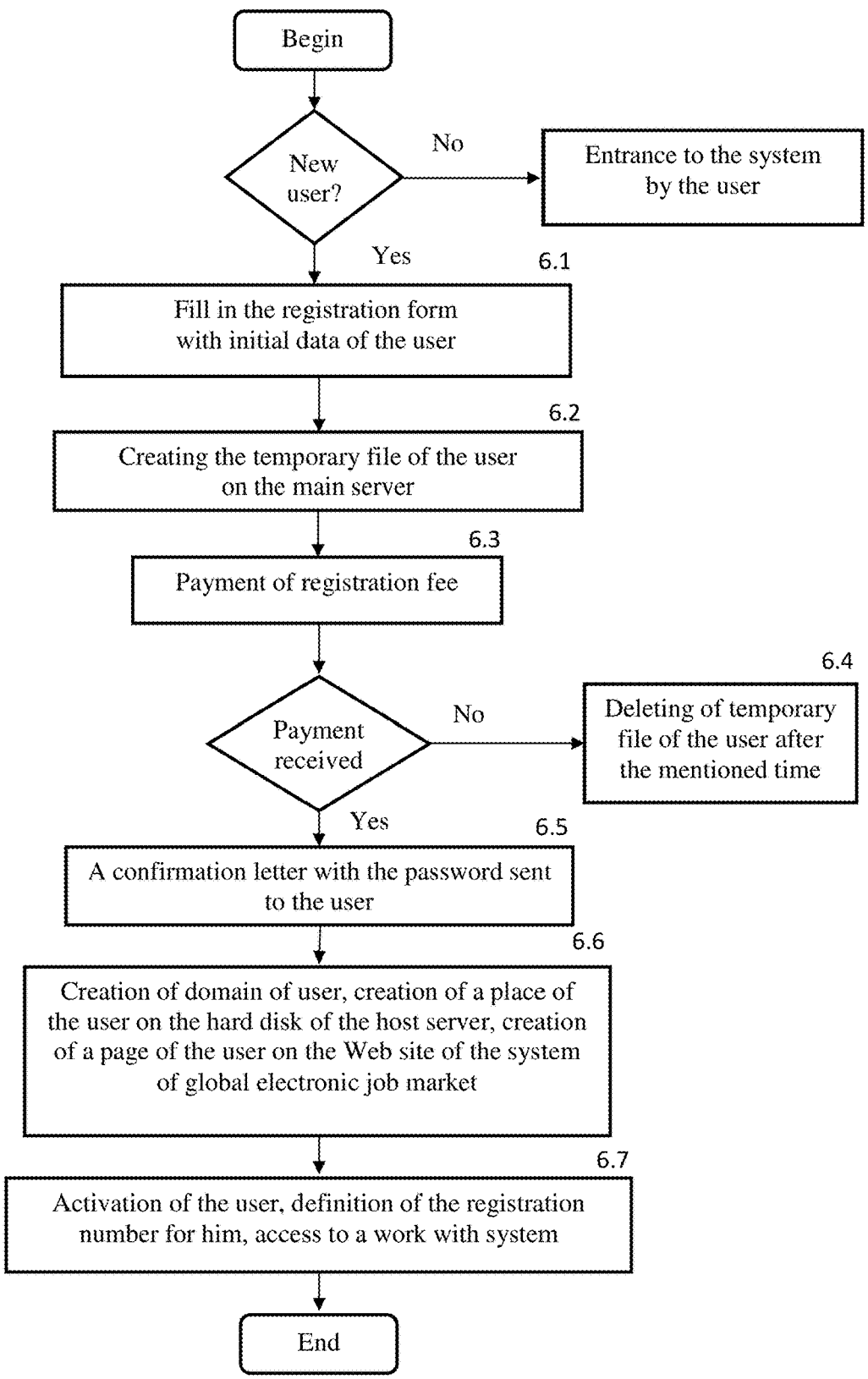
FIG. 6 is a detailed description of the registration block.

Registration procedure (FIG. 6) foresees next steps. In order to register, the new user must complete a registration form (6.1). This form includes items: status of a user from point of view of the system of global electronic job market, social status of user, name of user, address of a user, e-mail address of a user. We shall understand under the status of a user from point of view of the system of global electronic job market the following. Who is a user: is user a jobseeker, or is user an employer. So, the system of global electronic job market will propose for user in the registration form to choose his status: a jobseeker, or an employer. We shall understand under the social status of a user following. Who is a user: is user a private person, or is user a company, or is user an employment agency. So, the system of global electronic job market will propose for user in the registration form to choose his social status: a private person, or a company, or an employment agency. The private person inserts in item "name" of registration form his first name and family name. The company inserts in item "name" of registration form name of the company. The employment agency inserts in item "name" of registration form name of the employment agency. The private person inserts in item "address" of registration form his address. The company inserts in item "address" of registration form address of the company. The employment agency inserts in item "address" of registration form address of the employment agency. The private person inserts in item "e-mail address" of registration form his e-mail address. The company inserts in item "e-mail address" of registration form e-mail address of the company. The employment agency inserts in item "e-mail address" of registration form e-mail address of the employment agency.

After filling of the registration form the system of global electronic job market creates on this step a temporary file on the hard disks of the main server for the new user (6.2).

The next step of the registration procedure is a payment of a registration fee (6.3) by the new user. The system of global electronic job market will delete the temporary file of the new user in case of failure to pay the fee in the specified period (6.4). The system of global electronic job market sends a confirmation letter with password (6.5) for enter in a page of user. The system of global electronic job market will create a domain of user (6.6) in case of payment of the registration fee by the private person, or by the company, or by the employment agency. The creation of the domain of user means that the system of global electronic job market will prepare the place for the user on the hard disk of the host server of the system, and will prepare a page of the user on the Web site of the system. The user can use an automatic search of information from the database of information about offers of employers or from the database of information about jobseekers with periodic repetition, defined by him. The system of global electronic job market will store this information on a user's place of the hard disk of the host server of the system, and will provide an access for user to this information on the page of the user on the Web site of the system.

So, the system of global electronic job market gives access to a work with the system for all private persons, for all companies and employment agencies, which have paid the registration fee (6.7).

If the user is a company and the user will sign job contracts in the frame of the system of global job market, he has to insert a name and a job position of his official representative, who will sign job contracts on behalf of the company, into a special registration form. The company has to provide an sample of an official scanned signature of the official representative, who will sign job contracts on behalf of the company. Private persons, which will sign job contracts in the frame of the system of global job market, have also to provide an sample of the their scanned signature in the special registration form. Companies and other users of the system, having seals, provide a sample of a scanned print of the seal. Information, presented in the special registration forms, is considered confidential and will be unavailable. This information can be used for job contracts preparation in the frame of the system of global job market. These data will be stored in a database of confidential information. The database of confidential information comprises also addresses of private persons, who are jobseekers and who will sign a job contract in the frame of the system of global job market, and samples of scanned signatures of private persons, who want to sign a job contract in the frame of the system of global job market. The job contracts, which will be concluded and registered in the frame of the system of global job market, will be stored in the database of confidential information.

Companies and private persons, which will conclude job contracts in the frame of the system of global job market, insert also in this special form data for electronic signatures. The private persons and the official representatives, who will sign job contracts on behalf of the company, give in this special form their secret numeric alphabetic code, which will be the electronic signature. These data will be stored in the database of confidential information and will be used for verification of the electronic signature.

Users, having a seal, insert also in this special form data for electronic seal. The users give in this special form their secret numeric alphabetic code, which will be the electronic seal. These data will be stored in the database of confidential information and will be used for verification of the electronic seal.

It need to create, for operation of the system of global electronic job market, in the database of the system the group of related data tables of the International Classification of Specialities, where the International Classification of Specialities represents by itself a tree-like structure with names and corresponding codes of branches and sub-branches of main kinds of activity of person, where final branches of the tree represent names of specialities, and where primary keys of all tables of the International Classification of Specialities are presented in a form of digital codes.

It need also to create, for operation of the system of global electronic job market, in the database of the system the group of related data tables of the International Classification of Job Positions, where the International Classification of Job Positions represents by itself a tree-like structure with names and corresponding codes of basic groups and sub-groups of job positions, where final branches of the tree represent names of job positions, and where primary keys of all tables of the International Classification of Job Positions are presented in a form of digital codes.

There are two databases, which are open for free use, namely a database of information about jobseekers and a database of information about employers in the system of global electronic job market.

The database of information about jobseekers is relational database. This database comprises related tables. Part of tables will be prepared by the system of global electronic job market and will be stored in the main server of the system. All of these tables will be used also for the database of information about employers. These tables are: a table of education, a table of scientific degrees, a table of work experience, a group of tables of knowledge of languages, a table of salary, a table of type of work, a table of age, a table of gender, a group of tables of groups of countries, countries, regions, and cities.

The table of education comprises names of level of education: the higher (university), the higher (technical university), the higher (college), an average (grammar school), an average special, etc; and primary keys of this table.

The table of scientific degrees comprises names of scientific degrees: Dr. of Science (Dr. habil), PhD; and primary keys of this table. This table includes also rows with value: "no" and "not importance". The presence of last values in the table of scientific degrees is important, because a table of information about jobseekers will comprise a field of scientific degrees. According to rule of relational database, the tables of database cannot include of unfilled (empty) fields. Therefore, the table of information about jobseekers can have fields, where a jobseeker has not any scientific degree, with value: "no". The value "not importance" can be used by employers, if it is not important for employer has his employee a scientific degree or not.

The table of work experience comprises a gradation of work experience in years, for example: till 3 years, from 3 till 5 years, from 5 till 7 years, from 7 till 10 years, from 10 till 15 years, from 15 years till 20 years, over 20 years etc.; and primary keys of this table. The group of tables of knowledge of languages comprise: a table of languages with name of world languages and primary keys of this table, a table of level of knowledge of languages with gradations of levels, for example: I am fluent in language, I can read, write, speak and communicate, I can understand, I can read and translate with vocabulary, and I don't own; and primary keys of this table.

The table of salary comprises a gradation of salary in sums, for example: from 20000 to 25000 € per year, from 25000 to 30000 € per year, from 30000 to 35000 € per year, from 35000 to 40000 € per year and so on; and primary keys of this table.

The table of type of work comprises names of type of work, for example: the constant or the temporary job, the full or incomplete working day etc; and primary keys of this table.

The table of age comprises a gradation of age of jobseekers in years, and value "not importance" and primary keys of this table. The value "not importance" can be used by employers, if it is not important for employer, how old is his employee.

The table of gender comprises names of genders: male or female, and value "not importance" and primary keys of this table. The value "not importance" can be used by employers, if it is not important for employer, what gender his employee has.

The group of tables of groups of countries, countries, regions, and cities comprises: a group of tables of groups of countries of the world, a table of countries of the world with name of countries and primary keys of this table, tables of regions of countries with names of these regions, and primary keys of these tables, and tables of cities of countries with name of cities and primary keys of these tables. The group of tables of groups of countries of the world comprises: a table of continents and primary keys of this table, a table of groups of countries and primary keys of this table, for example: countries of European Union, countries of BRICS, countries of North American Free Trade Agreement and so on, and primary keys of this table. The table of groups of countries comprise also value "not". Value "not" can be used by users, if a country is not member of any group of countries.

Information about jobseekers is formed by jobseekers after the registration procedure. The database of information about jobseekers contains the information about jobseekers. It is formed on the basis of data, which the jobseeker enters in the special application form (FIG. 7). In first two fields of the application form the jobseeker enters the name and a surname (family name). In the third field the jobseeker enters the name of its speciality. He does it by means of the International Classification of Specialities. After pressing a triangle in a field the user will receive the popup menu with the classification presented in the form of a tree, for example as in the Internet an explorer. After that the user reaches on a tree the name of the necessary speciality and presses on this name. After that the speciality name will appear in the field. In the field 4 the jobseeker precisely also enters the name of the qualification from the table of qualifications of the International Classification of Specialities. In the field 5 the user enters a level of the education, which he will choose from the popup list, for example: the higher (university), the higher (technical university), the higher (college), an average (grammar school), an average special etc. Data, which appear in popup menus or in popup lists, are stored in corresponding tables of a database of the main server. In the field 6 the user enters a scientific degree if he has it. Data he will choose from the popup list, for example: Dr. of Science, PhD, or "no". In the field 7 the jobseeker enters the experience of work which he as well as in the previous case chooses from the popup list, for example: till 3 years, from 3 till 5 years, from 5 till 7 years, from 7 till 10 years, from 10 till 15 years, from 15 years till 20 years, over 20 years etc. In the field 8 the jobseeker enters data about knowledge of languages. The user will select this data from a popup menu. In the field 9 the jobseeker enters the name of a job position, which he would wish to receive. He does it by means of the International Classification of Job Positions as well as in case of a choice of the speciality. In the field 10 the user enters a level of salary, which he would wish to receive. Necessary level of salary he will choose from the popup list. In the field 11 the jobseeker enters data about type of work, which he would wish to receive. He will choose type of work from the popup list, for example: the constant or the temporary job, the full or incomplete working day etc. In the field 12 the jobseeker enters the age from popup list. In the field 13 the jobseeker enters a gender from popup list. In the field 14 the jobseeker specifies a continent, a group of countries, a country, a region and the city from the popup list. In the field 15 the jobseeker enters a Curriculum Vitae (CV). The CV can contain all the additional information, which can be interesting for employers. For example, this information can include a description of acquired education, a detailed description of the work experience, professional skills and so on. The system will provide recommendations for the preparation of CV in main languages. Information about education has a high priority. This information can include the name of speciality and qualification according to a diploma or a certificate, a name and location of an educational institution, which the jobseeker graduated from, the year of graduation, the number of the diploma or the certificate. The CV can be presented in English and in a native language. Jobseekers representing jobseeker agencies provide CVs of their clients. In the field 16 the jobseeker enters its the address of e-mail.

After filling of the specified form, data about the jobseeker get to the row of the table of information about jobseekers of the database of information about jobseekers (FIG. 8). The field 1 of the basic table of the database represents identification number (a primary key), which can coincide with number of a row for example. In the fields 2 both 3 the name and the surname (family name) of the jobseeker registers. The group of fields 4 further follows. These fields contain the information about a speciality, which was chosen by the user. The codes of all branches, the codes of sub-branches and at last the code of the chosen speciality from the last Table N of the International Classification of Specialities will be entered in this field (FIG. 2). All these fields will be the foreign keys related with primary keys of all tables of the International Classification of Specialities. In the group of fields containing the information about a speciality, the information related with the International Classification of Specialities will get only. No other information will get to this group of fields because the user has chosen the name of a speciality from the International Classification of Specialities. In the field 5 the code of qualification according to the name of qualification of a corresponding speciality which was chosen by the user from the International Classification of Specialities will be written down. This field will be the foreign key related with the primary key of the table of qualifications of the International Classification of Specialities. Only the information, related with the International Classification of Specialities, can be written in this field. No other information will get to this field. In fields 6, 7, 8 and 9 the codes of the information of an educational level, of a scientific degree, of the work experience, of knowledge of languages will be written. These codes are primary keys of corresponding tables of a database. Fields 6, 7, 8, and 9 will be foreign keys of corresponding tables of the database. The group of fields 10 containing the information about job position, which the jobseeker would like to receive, follows further. Codes of all groups of positions, subgroups of positions and at last a code of position, which the jobseeker would like to receive, from the last Table N of the International Classification of Job Positions (FIG. 4), will be entered in this field. All of these fields will be the foreign keys related with primary keys of all tables of the International Classification of Job Positions. Only information related with of the International Classification of Job Positions will get in the group of fields containing the information about a job positions, because the user has chosen the name of a job position from the International Classification of Job Positions. No other information will get to this field. In fields 11, 12 will be codes of the information about the desirable salary and about desirable type of work. These codes are primary keys of corresponding tables of a database. Fields 11 and 12 will be foreign keys of corresponding tables a database. In fields 13, 14 will be codes of the information about an age and about a gender of jobseeker. These codes are primary keys of corresponding tables of a database. Fields 13 and 14 will be foreign keys of corresponding tables of a database. In group of fields 15 will be codes of the information about the continent, the group of countries, the country, the region, and the city, where the jobseeker lives. These codes are primary keys of corresponding tables of a database. Fields 15 will be foreign keys of corresponding tables of a database. In the field 16 takes places CV the jobseeker. In the field 17 the e-mail address of the jobseeker is located. Data being in fields 4-15 are related with data of corresponding tables of a database of the main server. Data in fields 2, 3, 16 and 17 are inserted in a text format. All foreign keys in fields from 4 to 15 of the table of information about jobseekers are presented in form of digital codes.

The database of information about offers of employers is relational database. This database comprises related tables. Part of tables will be prepared by the system of global electronic job market and will be stored in the main server of the system. All of these tables will be used also for the database of information about jobseekers. These tables are: a table of education, a table of scientific degrees, a table of work experience, a group of tables of knowledge of languages, a table of salary, a table of type of work, a table of age, a table of gender, a group of tables of countries, regions, and cities.

Information about employers is provided by employers after the registration procedure. The database of information about offers of employers contains the information about offers of employers. It is formed on the basis of data, which the employer enters in the special application form (FIG. 9). In the field 1 the employer enters the company name. In the field 2 the employer enters the address of the company, which contains the post address and a name of the person for contact, an e-mail address, name of a Web site. In the field 3 the employer enters the name of the vacant job position. He does it by means of the International Classification of Job Positions. After pressing a triangle inside the field the user will receive the popup menu with the classification presented in the form of a tree, for example, as in the previous cases. After that the user reaches on a tree the name of the necessary job position and presses it. After that the name of the job position will appear in the field. In the field 4 the employer enters the name of the speciality, which the candidate on a vacant job position should have. He enters the name of the demanded speciality from the International Classification of Specialities, as well as in the previous cases. In the field 5 the employer enters the name of qualification from the International Classification of Specialities, which is necessary for the candidate on the vacant job position. In the field 6 the employer enters a necessary educational level of the candidate on the vacant job position, which employer chooses from the popup list. Data, which appear in popup menus or in popup lists, are stored in the same tables of a database of the main server, as in the previous case. In the field 7 the employer enters the experience of work, which the candidate on the vacant job position should have. The employer chooses the demanded experience of work from the popup list. In the field 8 the employer enters the name of a scientific degree, which the candidate on the vacant job position should possess. The employer chooses a scientific degree from the popup list. The employer uses the value "not importance" in case, if the employer has not interest to this. In the field 9 the employer inserts data about languages, which the candidate should know. In the field 10 the employer inserts level of the offered salary. In the field 11 the employer inserts work type: the constant or the temporary job, the full or incomplete working day etc. In the field 12 the employer will insert desirable age of the candidate for the vacant job position, if he has interest to this information. In opposite case the employer uses the value "not importance". In the field 13 the employer will insert a desirable gender of the candidate for the vacant job position, if this information will have for him any value. In opposite case the employer uses the value "not importance". In the field 14 the employer specifies a continent, a group of countries, a country, a region and a city where there is a specified vacant job position. The data in fields with 6 on 14 are brought from popup lists or the menu. In the field 15 the employer can insert additional data about the company, for example year of foundation of the company, a kind of company activity, a number of the personnel etc. In the field 16 the employer can insert the detailed description of an offered vacant job position and the additional requirements to the candidate. In the field 17 the employer can insert the description of side benefits, for example: the paid medical insurance, the paid pension insurance, the duration of holiday, the car, given by the company, possible bonuses, payment for a fitness club and others.

After filling of the specified application form, data about the offer of the employer get to the row of the table of information about offers of employers of the database of information about offers of employers (FIG. 10). The field of 1 basic table of the database represents identification number (a primary key), which can coincide with number of a row for example. The name of the company and its address gets to fields 2 and 3. In group of fields 4 the information about the vacant job position which is offered by the employer is contained. The codes of all groups of job positions, the codes of subgroups of job positions and at last a code of the chosen job position from the last Table N of the International Classification of Job Positions (FIG. 4) will be entered in these fields. All of these fields will be the foreign keys related with primary keys of all tables of the International Classification of Job Positions. Only the information related with the International Classification of Job Positions will get in the group of fields containing the information about the vacant job position, because user has chosen the name of a job position from the International Classification of Job Positions. No other information will get to these fields. The group of fields 5 contains the information about the speciality, which is required for the candidate on a vacant job position. The codes of all branches, the codes of subbranches and at last a code of the chosen speciality from the last Table N of the International Classification of Specialities (FIG. 2) will be entered in these fields. All of these fields will be the foreign keys related with primary keys of all tables of the International Classification of Specialities. Only the information related with the International Classification of Specialities will get in the group of fields containing the information about the speciality, because the employer has chosen the name of a speciality from the International Classification of Specialities. No other information will get to these fields. In the field 6 the qualification code will be written down, according to the name of qualification of the speciality, which the employer has chosen from the International Classification of Specialities. This field will be the foreign key related with the primary key of the table of qualifications of the International Classification of Specialities. Only the information related with the International Classification of Specialities will get to this field. No other information will get to this field. In fields 7, 8, 9 and 10 will be codes of the information about demanded the work experience, about an educational level, about a scientific degree and about knowledge of languages. These codes are primary keys of corresponding tables of a database. Fields 7, 8, 9, and 10 will be foreign keys of corresponding tables a database. In fields 11, 12 will be codes of the information about the offered salary and about work type. These codes are primary keys of corresponding tables of a database. Fields 11 and 12 will be foreign keys of corresponding tables a database. In fields 13, 14 will be codes of the information about wished age and gender of the candidate on a vacant job position. These codes are primary keys of corresponding tables of a database. Fields 13 and 14 will be foreign keys of corresponding tables a database. In group of fields 15 will be codes of the information about the continent, the group of countries, the country, the region, and the city where there is an offered vacant job position. These codes are primary keys of corresponding tables of a database. Fields 15 will be foreign keys of corresponding tables of a database. In the field 16 the information with additional data about the company gets. In the field 17 the information with the detailed description of an offered job position and with the additional requirements to the candidate gets. In the field 18 the information with the description of side benefits gets. Data being in fields 4-15 are related with data of corresponding tables of a database of the main server. Data in fields 2, 3, 16, 17 and 18 are inserted in a text format. All foreign keys in fields from 4 to 15 of the table of information about offers of employers are presented in form of digital codes.

Jobseekers and employers can introduce a modification into the abovementioned information. Users can change or delete information about their offers from the system at any time. They can also insert new offers at any time. Every user has a possibility to change only his/her own information.

Jobseekers can perform searching with the aim to find a needed job. For search of vacant positions in system of the global electronic job market the jobseeker should prepare request for searching of information about job vacancies. For this purpose he fills a special application form of request (FIG. 11). In the field 1 of this form the jobseeker inserts a name of a branch or sub-branch of kind of people activity, or a name of a speciality according to the International Classification of Specialities. After pressing a triangle in a field of the application form the user will receive the popup menu with the classification presented in the form of a tree, as well as in the previous cases. After that the user reaches on the tree a name of branch or sub-branch of kind of people activity, for example: electrical engineering, or a name of a necessary speciality, for example: electrical drive, and presses it. After that the name of the branch or sub-branch of kind of people activity, or the name of the speciality in the text format will appear in the field 1 of the application form.

Next position of the form of the request is a name of subgroup of job positions or a name a desired job position according to the International Classification of Job Positions. After pressing a triangle in the field 2 of the application form the user will receive the popup menu with the International Classification of Job Positions presented in the form of a tree, as well as in the previous cases. After that the user reaches on the tree the a name of subgroup of positions, for example: teachers of university, or a name of the desired job position, for example: the professor, and presses it. After that the name of the subgroup of positions, or the name of the desired job position in the text format will appear in the field 2 of the application form.

Next position of the form of the request is a desired group of countries or country according to the tables of groups of countries or countries. The name of the desired group of countries or country in the text format will appear in the field 3 of the application form.

After the jobseeker has filled out the form of the request, the system of the global electronic job market forms the request for searching of information about job vacancies with help of the Web site of the system on the basis of data, submitted in the form of request by the jobseeker. As a result, the request for searching comprises the following data.

The request for searching comprises a digital code, which is related with corresponding field of group of fields of speciality of the table of information about offers of employers of the database of information about offers of employers. This field corresponds or to the branch of kind of people activity, or to the sub-branch of kind of people activity, or to the speciality, which was presented in the form of request by the jobseeker. This digital code is foreign key of correspondent table of the International Classification of Specialities. The jobseeker has chosen the desired name of the branch of kind of people activity, or of the sub-branch of kind of people activity, or of the speciality from the tree of the International Classification of Specialities in text format and has inserted it in the form of the request. The system of the global electronic job market exactly knows the digital code of this name, and to which field of the table of information about offers of employers this code is corresponded, because this is related data of relational database.

The request for searching comprises a digital code, which is related with corresponding field of group of fields of job position of the table of information about offers of employers of the database of information about offers of employers. This field corresponds or to the subgroup of positions, or to the desired job position of the jobseeker, which was presented in the form of request by the jobseeker. This digital code is foreign key of correspondent table of the International Classification of Job Positions. The jobseeker has chosen the desired name of the subgroup of positions, or of the desired job position from the tree of the International Classification of Job Positions in text format and has inserted it in the form of the request. The system of the global electronic job market exactly knows the digital code of this name, and to which field of the table of information about offers of employers this code is corresponded, because this is related data of relational database.

The request for searching also comprises a digital code, which is related with corresponding field of group of fields of country, region, and city of the table of information about offers of employers of the database of information about offers of employers. This field corresponds or to desired group of countries, or to the country, where the jobseeker wants to find a job, which was presented in the form of request by the jobseeker. The digital code is foreign key of correspondent table of groups of countries or of the table of countries. The jobseeker has chosen the desired name of the group of countries, or of the country from the table of groups of countries or of the table of countries of relational database of the system in text format and has inserted it in the form of the request. The system of the global electronic job market exactly knows the digital code of this name, and to which field of the table of information about offers of employers this code is corresponded, because this is related data of relational database.

Figure 13:
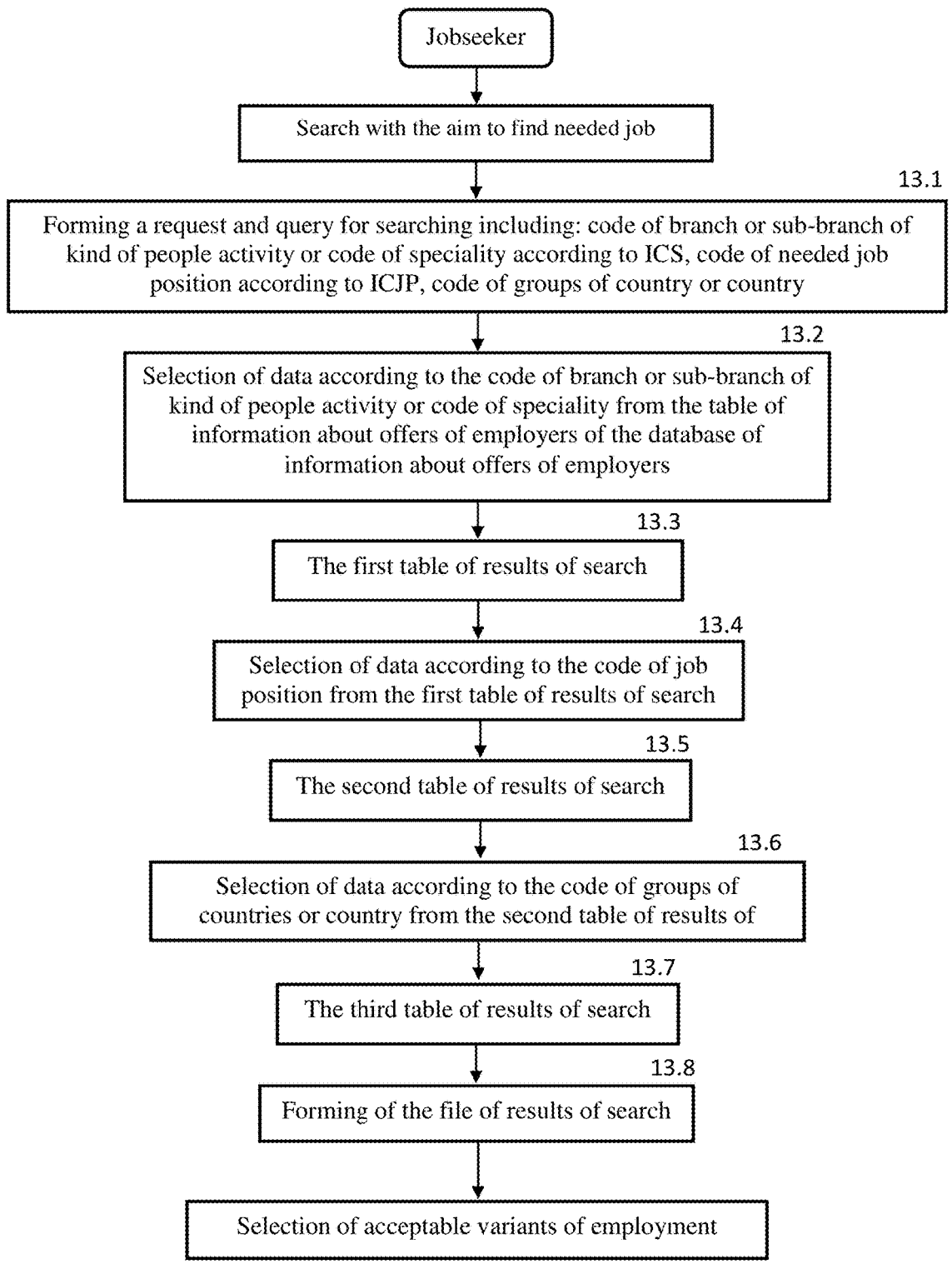
FIG. 13 discloses the process of searching for a needed job by a jobseeker.

Searching and selection of results (FIG. 13) will be carried out from the table of information about offers of employers of the database of information about offers of employers. At the first stage of search the system will consider all data in the fields of specialities of the table of offers of employers of the database of information about offers of employers (FIG. 10). The system of global electronic job market will consider a field of a branch of kind of people activity, if the jobseeker has chosen in the request for searching of information about job vacancies the branch of kind of people activity. The system of global electronic job market will consider a field of a sub-branch of kind of people activity, if the jobseeker has chosen in the request the sub-branch of kind of people activity. The system of global electronic job market will consider a field of a speciality, if the jobseeker has chosen in the request the speciality. Then, the system of global electronic job market fulfills a selection of data from the table of information about offers of employers of the database of information about offers of employers (13.2) with help of a query, which will be formed on the basis of the request of the jobseeker. This is possible to carry out, for example, with help of the statement of "SELECT" of the SQL (Structured Query Language). The system will compare codes of the branch of kind of people activity or of the sub-branch of kind of people activity, or of speciality from request of the jobseeker with codes of branch of kind of people activity or of the sub-branch of kind of people activity, or of specialities being in said fields (columns) of specialities of the table of information about offers of employers of the database of information about offers of employers for all rows of the table. In case of coincidence of codes, all rows from the table of information about offers of employers of the database of information about offers of employers, where there were these codes, will be written down in a first table of results of search (13.3). The result of search will be absolutely unequivocal and complete, because codes of the branch of kind of people activity or of the sub-branch of kind of people activity, or of the speciality in the request of the jobseeker and the codes of branches of kind of people activity or of sub-branches of kind of people activity, or of speciality in the fields of specialities of a database of offers of employers are written down from the International Classification of Specialities. That is, only the offers of employers having the codes coincidences with request of jobseeker will get to result of search. No other offers of employers will get to the first table of result of search. Selection of data will be complete, that is, all data corresponding to the request, which are available at the moment in the database of information about offers of employers, will get to result of search. Any other row will not be passed. At the given algorithm of search it simply is not possible.

At the second stage of searching, the selection from the fields of the first table of result of search will be made (13.4). The system of global electronic job market will consider a field of a subgroup of positions of the first table of result of search, if the jobseeker has chosen in the request the subgroup of positions. The system of global electronic job market will consider a field of job position, if the jobseeker has chosen in the request the job position. The system will compare codes of the subgroup of positions or the job position from request of the jobseeker with codes of fields of the subgroup of positions or the job position in the first table of result of search. In case of coincidence of codes, the row from the first table of result of search, where there was this code, will be written down in a second table of results of search (13.5). The result of search will be again absolutely unequivocal and complete, because codes of the subgroup of positions or of the job position in the request of the jobseeker and the codes of subgroups of positions or of job positions in the fields of job positions of the first table of result of search are written down from the International Classification of Job Positions. That is, only the offers of employers having the codes coincidences with request of jobseeker will get to the second table of result of search. No other offers of employers will get to the second table of result of search. Selection of data will be complete, that is, all data corresponding to the request, which are available at the moment in the first table of result of search, will get to the second table of result of search. Any other row will not be passed.

At the third stage of searching, the selection will be made from the fields of the countries of the second table of results of search (13.6). The system of global electronic job market will consider a field of a groups of countries of the second table of result of search, if the jobseeker has chosen in the request the group of countries. The system of global electronic job market will consider a field of countries, if the jobseeker has chosen in the request the country. The system will compare codes of the group of countries or the country from request of the jobseeker with codes of fields of the group of countries or the country in the second table of result of search. In case of coincidence of codes, the row from the second table of result of search, where there was this code, will be written down in a third table of results of search (13.7). The result of search will be again absolutely unequivocal and complete, because codes of the group of countries or of the country in the request of the jobseeker and the codes of group of countries or of country in the fields of countries of the second table of result of search are written down from the table of groups of countries or from the table of countries. That is, only the offers of employers having the codes coincidences with request of jobseeker will get to the third table of result of search. No other offers of employers will get to the third table of result of search. Selection of data will be complete, that is, all data corresponding to the request, which are available at the moment in the second table of result of search, will get to the third table of result of search. Any other row will not be passed.

So, the third table of result of search will completely correspond to request of the jobseeker.

The system of global electronic job market creates the file of result of search of job vacancies according to the request of the jobseeker on the basis of the third table of result of search (13.8). The file of result of search is a full copy of the third table of result of search. Therefore, the file of result of search has a structure, which completely corresponds to a structure of the table of information about offers of employers of the database of information about offers of employers. The file of result of search will completely correspond to request of the jobseeker. After that the file of result of search becomes accessible for the jobseeker.

Thus, searching of information about job vacancies according to the request of jobseeker from the table of information about offers of employers of the database of information about offers of employers comprises the following combination of steps.

First step of the searching is the preparation of the query by the Web site of the system of global electronic job market for selection of information from the database of information about offers of employers on the basis of the request of jobseeker (13.1).

Second step of the searching is selection of corresponding information from the table of information about offers of employers of the database of information about offers of employers. This selection comprises the following combination of steps. First step of the selection is the comparison of a digital code of the request for searching of information about job vacancies with digital codes of the corresponding field of group of fields of speciality of the table of information about offers of employers in all rows of the table. This corresponding field of group of fields of speciality of the table has been defined by the Web site of the system of global electronic job market in the request for searching of information about job vacancies. Second step of the selection is recording in a first table of results of search all rows of the table of information about offers of employers, where the digital code of the request for searching of information about job vacancies coincides with digital codes of the of corresponding field of group of fields of speciality of the table of information about offers of employers. Third step of the selection is the comparison of a digital code of the request for searching of information about job vacancies with digital codes of a corresponding field of group of fields of job positions of the first table of results of search in all rows of the table. The corresponding field of group of fields of job positions of the table has been defined by the Web site of the system of global electronic job market in the request for searching of information about job vacancies. Fourth step of the selection is recording in a second table of results of search all rows of the first table of results of search, where the digital code of the request for searching of information about job vacancies coincides with digital codes of the of corresponding field of group of fields of job positions of the first table of results of search. Fifth step of the selection is the comparison of a digital code of the request for searching of information about job vacancies with digital codes of a corresponding field of group of fields of groups of countries or of countries of the second table of results of search in all rows of the table. The corresponding field of group of fields of groups of countries or of countries of the table has been defined by the Web site of the system of global electronic job market in the request for searching of information about job vacancies. Sixth step of the selection is recording in a third table of results of search of all rows of the second table of results of search, where the digital code of the request for searching of information about job vacancies coincides with digital codes of the of corresponding field of group of fields of groups of countries or of countries of the second table of results of search.

Third step of the searching is forming a file of results of search of information about job vacancies according to the request of jobseeker. The file of results of search is formed on the basis of third table of result of search. The file of results of search comprises the following combination of properties. Structure of the file of results of search completely corresponds to the structure of the table of information about offers of employers of the database of information about offers of employers. The file of results of search has exactly the same fields that the table of information about offers of employers. The file of results of search of job vacancies completely corresponds to the request of jobseeker, because the digital codes of the request of jobseeker and digital codes of corresponding fields of the table of information about offers of employers have been written from one sources, from the related data tables of the system of global electronic job market. As a result, only information, which is coincided with the request of jobseeker, can be included in the file of results of search. The file of results of search is stored on disks of the main server in format, which is corresponded to the format of the table of information about offers of employers of the database of information about offers of employers. This means that data in the file of result of search, which is stored on disks of the main server, are in digital format. The file of result of search, which is stored on disks of the main server, will be used for sorting or selection of data. The file of result of search will be transformed for a jobseeker in text and digital format of corresponding fields (columns) of the file, in form, which is convenient for reading, and is sent to a computer of the user. In the file of result of search, which is transformed for the jobseeker, in field "Job position" will be name of proposed job position, for example: "Principal engineer", in field "Speciality" will be a name of demanded speciality, for example: "Electrical drive", in field desired "work experience" will be number of years of work in this speciality, for example: "10 years", in field "Offered salary" will be a value of proposed salary, for example: "60000 € per year", in field of "Groups of countries, country, region, city", will be, for example: Germany, Baden-Wurttemberg, Stuttgart, and so on. The file of results of search of information about job vacancies is accessible for the jobseeker and can be saved on a computer of the jobseeker.

As a result of searching and selection, the information, stored in the database of offers of employers and located on disks of the main server, will be transformed according to request of the jobseeker. The file with results of search will represent the table not simply with the list of offers of employers as it takes place in the database. The file with results of search will represent the table with the list of offers only those employers, the offers of which (the name of a speciality, job position, a work place) coincide with request of the searcher of work. Thus the information received by the jobseeker qualitatively differs from the information stored on disks of the main server. The information received by the user, corresponds to his request and is useful to him. The information, stored on disks of the main server, without its transformation, that is, without searching and selection, does not represent for the concrete user of any interest, because this is the information about very large number of specialists in all world.

Employers can conduct searching with the aim to find needed employees. For search of the employee for a vacant position (an offered job position) in the system of the global electronic job market the employer should prepare also request about search. For this purpose he fills a special application form of request (FIG. 12). In the field 1 of this form, the employer inserts a name of a branch or sub-branch of kind of people activity, or a name of a demanded speciality of the required employee according to the International Classification of Specialities, as well as in previous case with help of the tree of the International Classification of Specialities. After that the employer reaches a name of branch or sub-branch of kind of people activity, a name of the a required speciality of employee for the offered job position and presses it. After that the name of the branch or sub-branch of kind of people activity, or the name of the speciality of employee for the offered job position, in the text format, will appear in the field 1 of the application form.

Next position of the form of the request for searching of information about needed employees by the employer is a name of subgroup of job positions, or a name of an offered job position according to the International Classification of Job Positions. After pressing a triangle in the field 2 of the application form the user will receive the popup menu with the International Classification of Job Positions presented in the form of a tree, as well as in the previous cases. After that the user reaches on the tree the a name of subgroup of positions or a name of the offered job position and presses it. After that the name of the subgroup of positions, or the name of the offered job position in the text format will appear in the field 2 of the application form.

Next position of the form of the request is a group of countries or a country according to the tables of groups of countries or the table of countries. The name of the group of countries or the name of the country, where a company of the employer is situated, in the text format will appear in the field 3 of the application form.

After the employer has filled out the form of the request, the system of the global electronic job market forms the request for searching of information about needed employees with help of the Web site of the system on the basis of data, submitted in the form of request by the employer. As a result, the request for searching comprises the following data.

The request for searching comprises a digital code, which is related with corresponding field of group of fields of speciality of the table of information about jobseekers of the database of information about jobseekers. This field corresponds or to the branch of kind of people activity, or to the sub-branch of kind of people activity, or to the required speciality of employee, which was presented in the form of request by the employer. This digital code is foreign key of correspondent table of the International Classification of Specialities. The employer has chosen the desired name of the branch of kind of people activity, or of the sub-branch of kind of people activity, or of the speciality from the tree of the International Classification of Specialities in text format and has inserted it in the form of the request. The system of the global electronic job market exactly knows the digital code of this name, and to which field of the table of information about jobseekers this code is corresponded, because this is related data of relational database.

The request for searching comprises a digital code, which is related with corresponding field of group of fields of job position of the table of information about jobseekers of the database of information about jobseekers. This field corresponds or to the subgroup of positions, or to the offered job position, which was presented in the form of request by the employer. This digital code is foreign key of correspondent table of the International Classification of Job Positions. The employer has chosen the desired name of the subgroup of positions, or of the offered job position from the tree of the International Classification of Job Positions in text format and has inserted it in the form of the request. The system of the global electronic job market exactly knows the digital code of this name, and to which field of the table of information about jobseekers this code is corresponded, because this is related data of relational database.

The request for searching comprises a digital code, which is related with corresponding field of group of fields of country, region, and city of the table of information about jobseekers of the database of information about jobseekers. This field corresponds or to group of countries, or to the country, where the company of the employer is situated, which was presented in the form of request by the employer. This digital code is foreign key of correspondent table of groups of countries or of the table of countries. The employer has chosen the desired name of the group of countries, or of the country from the table of groups of countries or of the table of countries of relational database of the system in text format and has inserted it in the form of the request. The system of the global electronic job market exactly knows the digital code of this name, and to which field of the table of information about jobseekers this code is corresponded, because this is related data of relational database.

Figure 14:
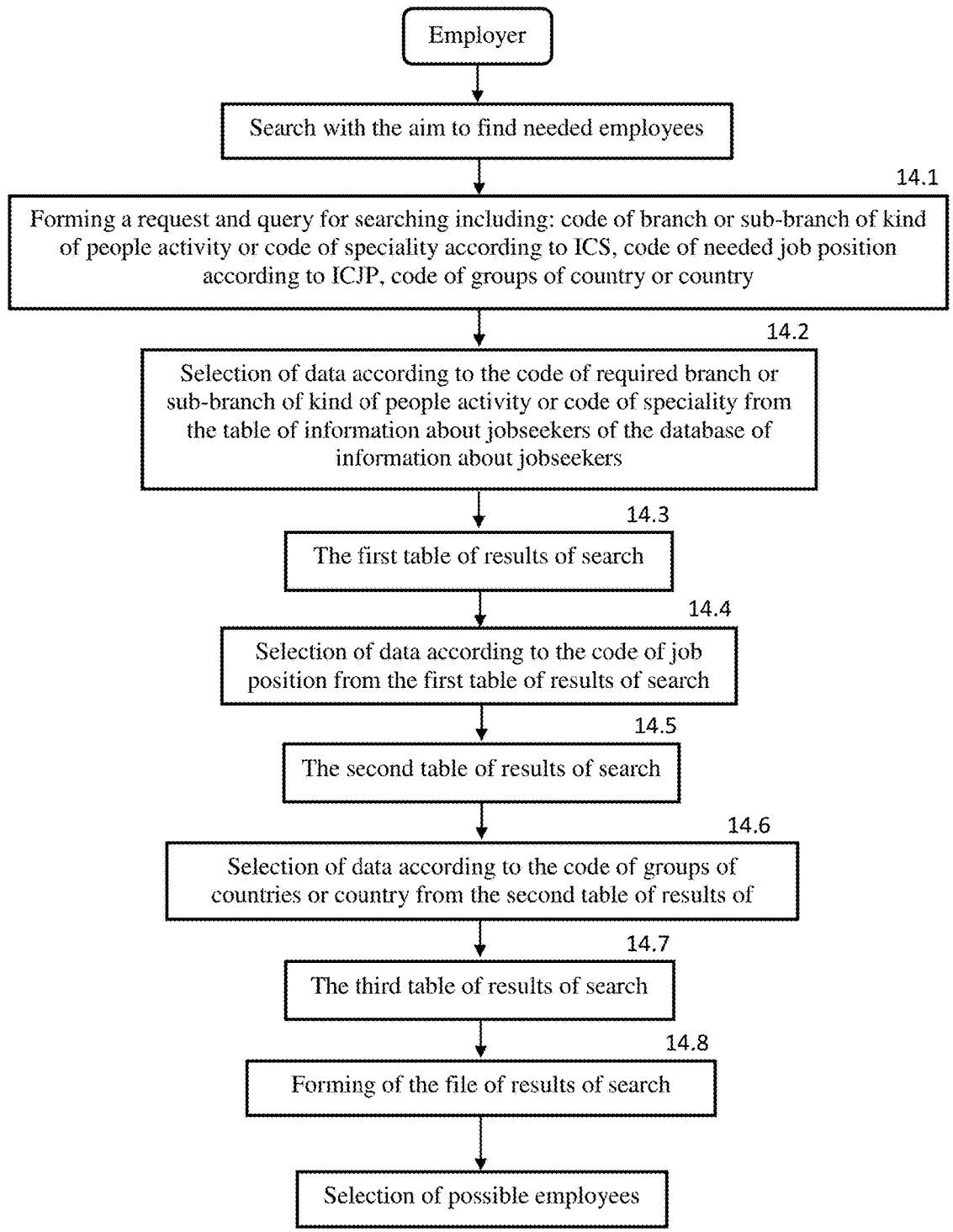
FIG. 14 discloses the process of searching for needed employees by an employer.

Searching and selection of results (FIG. 14) will be carried out from the table of information about jobseekers of the database of the information about jobseekers. The system of the global electronic job market will consider all data in the fields of specialities of the table of information about jobseekers of the database of the information about jobseekers at the first stage of search (FIG. 8). The system of global electronic job market will consider a field of a branch of kind of people activity, if the employer has chosen in the request for searching of information about jobseekers the branch of kind of people activity. The system of global electronic job market will consider a field of a sub-branch of kind of people activity, if the employer has chosen in the request the sub-branch of kind of people activity. The system of global electronic job market will consider a field of a speciality, if the employer has chosen in the request the speciality. Then, the system of global electronic job market fulfills a selection of data from the table of information about jobseekers of the database of information about jobseekers (14.2) with help of a query, which will be formed on the basis of the request of the employer. This is possible to carry out, for example, with help of the statement of "SELECT" of the SQL (Structured Query Language). The system will compare codes of the branch of kind of people activity or the sub-branch of kind of people activity, or of speciality from request of the employer with codes of the branch of kind of people activity or the sub-branch of kind of people activity, or of speciality, which are in the field (columns) of specialities of the table of information about jobseekers of the database of the information about jobseekers for all rows of the table. The all rows from the table of information about jobseekers of the database of the information about jobseekers, where there were these codes, will be written down in a first table of results of search (14.3) in case of coincidence of codes. The result of search will be absolutely unequivocal and complete, because the codes of the branch of kind of people activity or of the sub-branch of kind of people activity, or of the speciality in the request of the employer and codes of the branch of kind of people activity or of the sub-branch of kind of people activity, or of the speciality in the field of specialities of the database of the information about the jobseekers are written down from the International Classification of Specialities. That is, the information about the jobseeker, which has the speciality specified in the request of the employer, will get to the first table of result of the search only. No other data will get to the first table of result of the search. Selection of data will be complete. That is, all data corresponding to the request about the jobseeker having a speciality specified in the request, which are available at the moment in the database of the information about the jobseekers, will get to result of search.

Selection from the fields of the first table of result of search will be made at the second stage of search (14.4). The system of global electronic job market will consider a field of a subgroup of job positions of the first table of result of search, if the employer has chosen in the request the subgroup of positions. The system of global electronic job market will consider a field of job position, if the employer has chosen in the request the job position. The system will compare codes of the subgroup of positions or the job position from request of the employer with codes of fields of the subgroup of positions or the job position in the first table of result of search. In case of coincidence of codes, the row from the first table of result of search, where there was this code, will be written down in a second table of results of search (14.5). The result of search will be again absolutely unequivocal and complete, because codes of the subgroup of positions or of the job position in the request of the employer and the codes of subgroups of positions or of job positions in the fields of job positions of the first table of result of search are written down from the International Classification of Job Positions. That is, only the information about jobseekers having the codes coincidences with the request of employer will get to the second table of result of search. No other information about jobseekers will get to the second table of result of search. Selection of data will be complete, that is, all data corresponding to the request, which are available at the moment in the first table of result of search, will get to the second table of result of search. Any other row will not be passed.

At the third stage of searching, the selection will be made from the fields of the countries of the second table of results of search (14.6). The system of global electronic job market will consider a field of a group of countries of the second table of result of search, if the employer has chosen in the request the group of countries. The system of global electronic job market will consider a field of countries, if the employer has chosen in the request the country. The system will compare codes of the group of countries or the country from request of the employer with codes of fields of the group of countries or the country in the second table of result of search. In case of coincidence of codes, the row from the second table of result of search, where there was this code, will be written down in a third table of results of search (14.7). The result of search will be again absolutely unequivocal and complete, because codes of the group of countries or of the country in the request of the employer and the codes of group of countries or of country in the fields of countries of the second table of result of search are written down from the table of groups of countries or from the table of countries. That is, only the information about jobseekers having the codes coincidences with request of the employer will get to the third table of result of search. No other information about jobseekers will get to the third table of result of search. Selection of data will be complete, that is, all data corresponding to the request, which are available at the moment in the second table of result of search, will get to the third table of result of search. Any other row will not be passed.

So, the third table of result of search will completely correspond to request of the employer.

The system of global electronic job market creates the file of result of search of jobseekers according to the request of a employer on the basis of the third table of result of search (14.8). The file of result of search is a full copy of the third table of result of search. Therefore, the file of result of search has a structure, which completely corresponds to a structure of the table of information about jobseekers of the database of information about jobseekers. The file of result of search will completely correspond to request of the employer. After that the file of result of search becomes accessible for the employer.

Thus, searching of information about needed employees according to the request of employer from the table of information about jobseekers of the database of information about jobseekers, comprises the following combination of steps.

First step of the searching is the preparation of the query by the Web site of the system of global electronic job market for selection of information from the database of information about jobseekers on the basis of the request of employer (14.1).

Second step of the searching is selection of corresponding information from the table of information about jobseekers of the database of information about jobseekers. This selection comprises the following combination of steps. First step of the selection is the comparison of a digital code of the request for searching of information about jobseekers with digital codes of the corresponding field of group of fields of speciality of the table of information about jobseekers in all rows of the table. This corresponding field of group of fields of speciality of the table has been defined by the Web site of the system of global electronic job market in the request of employer. Second step of the selection is recording in a first table of results of search all rows of the table of information about jobseekers, where the digital code of the request for searching of information about jobseekers coincides with digital codes of the of corresponding field of group of fields of speciality of the table of information about jobseekers. Third step of the selection is the comparison of a digital code of the request of employer with digital codes of a corresponding field of group of fields of job positions of the first table of results of search in all rows of the table. The corresponding field of group of fields of job positions of the table has been defined by the Web site of the system of global electronic job market in the request of employer. Fourth step of the selection is recording in a second table of results of search all rows of the first table of results of search, where the digital code of the request of employer coincides with digital codes of the of corresponding field of group of fields of job positions of the first table of results of search. Fifth step of the selection is the comparison of a digital code of the request of employer with digital codes of a corresponding field of group of fields of groups of countries or of countries of the second table of results of search in all rows of the table. The corresponding field of group of fields of groups of countries or of countries of the table has been defined by the Web site of the system of global electronic job market in the request of the employer. Sixth step of the selection is recording in a third table of results of search of all rows of the second table of results of search, where the digital code of the request of employer coincides with digital codes of the of corresponding field of group of fields of groups of countries or of countries of the second table of results of search.

Third step of the searching is forming a file of results of search of information about needed employees according to the request of employer. The file of results of search is formed on the basis of third table of result of search. The file of results of search comprises the following combination of properties. Structure of the file of results of search completely corresponds to a structure of the table of information about jobseekers of the database of information about jobseekers, the file of results of search has exactly the same fields that the table of information about jobseekers. The file of results of search of information about needed employees completely corresponds to the request of employer, because the digital codes of the request of employer and digital codes of corresponding fields of the table information about jobseekers have been written from one sources, from the related data tables of the system of global electronic job market. As a result, only information, which is coincided with the request of employer, can be included in the file of results of search. The file of results of search is stored on disks of the main server in format, which is corresponded to the format of the table of information about jobseeker of the database of the information about jobseekers. This means that data in the file of result of search, which is stored on disks of the main server, are in digital format. The file of result of search, which is stored on disks of the main server, will be used for sorting or selection of data. The file of result of search will be transformed for an employer in text and digital format of corresponding fields (columns) of the file, in form, which is convenient for reading, and is sent to a computer of the user. In the file of result of search, which is transformed for the employer, in field "Speciality" will be a name of speciality of jobseeker, for example: "Applied mathematics", in field "work experience" will be number of years of work in this speciality, for example: "10 years", in field "Desired job position" will be name of desired job position, for example: "Principal mathematician", in field "Desired salary" will be a value of desired salary, for example: "60000 € per year", in field of "Groups of countries, country, region, city", will be, for example: France, Lorraine, Nancy, and so on. The file of results of search of information about needed employees is accessible for the employer and can be saved on a computer of the employer.

As a result of searching and selection, the information, stored in a database of the information about the jobseeker and located on disks of the main server, will be transformed according to the request of the employer. Thus, the result of the search will correspond completely to the request of the employer. The file with results of search will represent the table not simply with the list of offers of searchers of work as it takes place in the database. The file with results of search will represent the table with the list of offers only those searchers of the work, offers of which (the speciality name, the job position name, a work place) coincide with request of the employer. Thus, the information received by the employer qualitatively differs from the information stored on disks of the main server. The information received by the employer, corresponds to his request and is useful to him. The information, stored on disks of the main server without its transformation, that is, without searching and selection, does not represent for the concrete employer of any interest, because this is the information about very large number of jobseekers in all world.

The structure of files of information, received by users as a result of searching and selection, completely corresponds to database structure from which they have been received. The most part of columns of such file represent the codes, which have been written down from the International Classification of Specialities or from the International Classification of Job Positions, or the codes, which have been written down from other tables of the database of the system. That is, the information stored in these files is structured. Hence, various sorting and selections can be made with such information.

We shall understand the term the "sorting" as ordering of data in the file of results of search in compliance with some criterion. In capacity of criterion of sorting must be a name of a field (a column) of the file of result of search. For example, if the user wants sorting data in accordance with name of country, he must choose the country as criterion of sorting. Then, the program of sorting of main server of the system of global electronic job market carries out the sorting. The program will dispose countries in the field (column) of countries in alphabetic order from a first row (line) of the file to the last. The program of sorting will change sequence order of rows of the file of result of search in accordance with the result of sorting. The information in the concrete row will not be changed, this row only changes the position according to sorting. The number of rows of the file of result of sorting, accordingly the size of the file of result of search, will not change in result of sorting.

The user can make sorting of the received data on the basis of one of the chosen criteria by means of the special form (FIG. 15). After pressing of the button in a line of the chosen criterion, the line becomes active. Sorting of results of search according to a job position will be made in case, if the search was made by user on the basis of subgroup of job positions. In this case sorting of results of search according to a job position will be made in alphabetic order the first letter of the name of a job position. The algorithm of sorting according to the name of the country, region and a city will be a following. In a first step the sorting according to the country name will be made. In a following step sorting under the name of region will be made and in last step sorting under the city name finally will be made. Sorting of results of search according to qualification will be made under qualification names. At sorting of results of search according to the salary, there will be a popup menu in which it will be offered to user to choose algorithm of sorting: on increase or on salary decrease. Sorting of results of search according to the work experience will be made according to the period of the work experience. Sorting of results of search according to work type will be made under names of type of work. Sorting of results of search according to an educational level will be made under educational level names. Sorting of results of search according to a scientific degree will be made under scientific degree names. Sorting of results of search according to knowledge of languages will be made under names of languages in alphabetic order. For sorting of results of search according to age will appear the popup menu in which it will be offered to user to choose algorithm of sorting: on increase or on age decrease. Sorting of results of search according to a gender will be made under gender names. It is necessary to notice, that the size of a file of results of search will not change as a result of sorting. The sequence of lines depending on sorting will change only.

We shall understand the term the "selection" as a select (a retrieval) of data from the file of results of search in compliance with some criterion. In capacity of criterion of selecting must be a name of a field (a column) of the file of result of search. For example, if the user wants to select data from the file of results of search in accordance with name of country, he must choose the name of country as criterion of selection. The user must choose the name of country from the popup list. Then, the program of selection of main server of the system of global electronic job market carries out the selection. The program will select from the file of result of search only the rows, in which, in the field of countries, is the country, which the user has chosen. In result of selection, the system of global electronic job market will create a new file of result of selection, where in field of countries will be only the country, chosen by user. The information in rows, which were copied in the file of result of selection, will not be changed. The number of rows of the file of result of selection, accordingly the size of the file of result of selection, will be less than the file of result of search.

Figure 17:
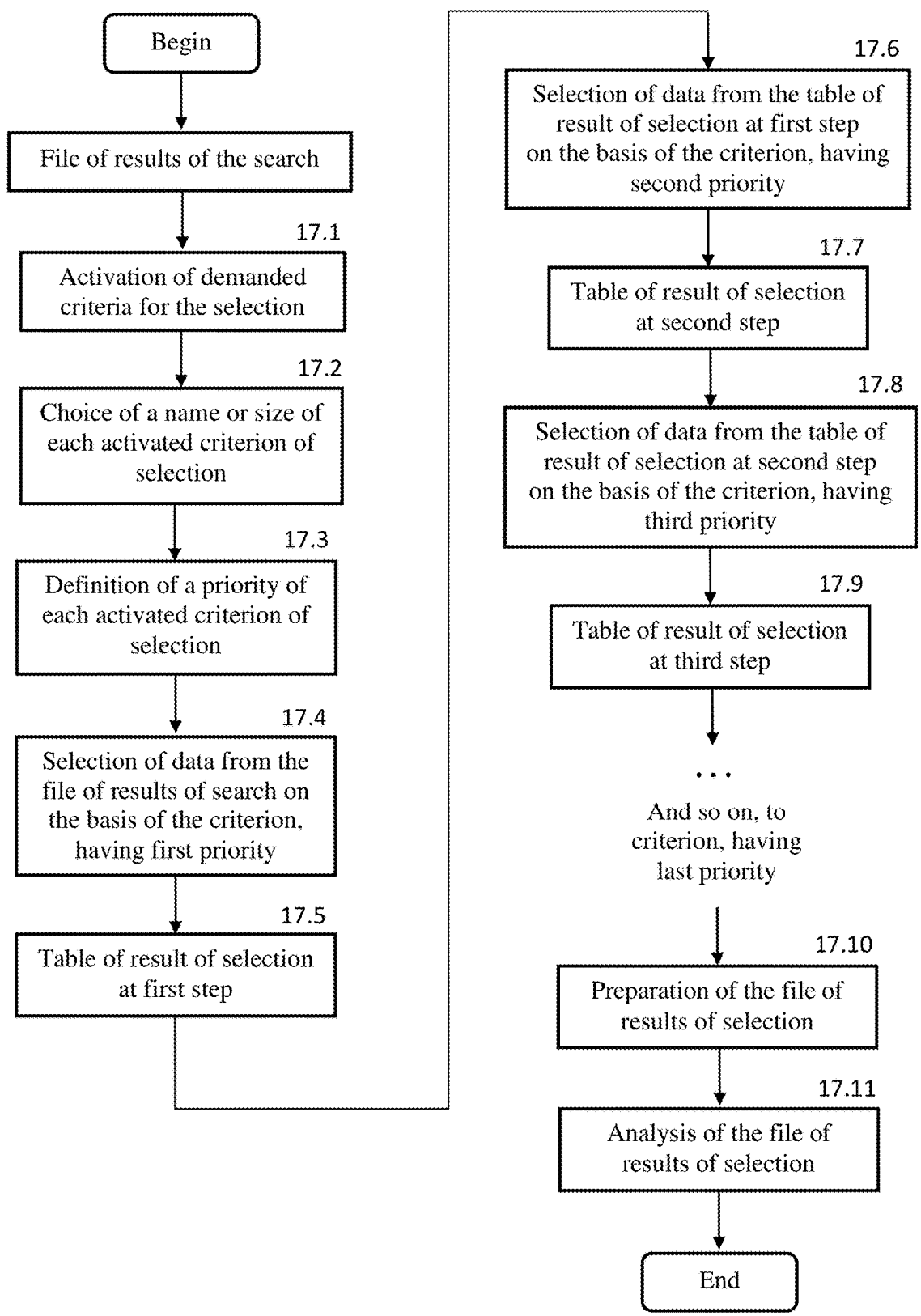
FIG. 17 shows an algorithm of selection.

The file of results of search can be very big. For selection of data from the file of results of search, the user of system of a global electronic job market (the jobseeker or the employer) can use the special form (FIG. 16). Names of criteria of selection in this form coincide with the name of columns of the file of results of search. In the beginning the user chooses and includes the criteria of selection by means of the buttons, which are in a column "Switch on, switch off". Then the lines with the chosen criteria become active (FIG. 17, 17.1). Further the user chooses the name or size of the included criteria of selection (17.2). The user chooses the name of a job position, if the search was made by user on the basis of subgroup of job positions. The user chooses the name of the country, region and a city from the popup list. The user chooses the name of qualification. Salary size, period of the experience of work, the name of type of work, educational level, the scientific degree name, the language name, the level of competence in language in criterion of "knowledge of languages», an age, a gender the user chooses from the popup list or the popup menu, if the given criterion is active. The names or sizes of each activated criterion of selection for the choice is given by Web site of the system of global electronic job market in popup menus or in popup lists from the file of result of search. The program of the Web site of the system of global electronic job market defines names, values or sizes of activated criteria on the basis of data of the file of result of search.

After inclusion of criteria of selection and installation of their names and sizes, the user can establish a priority of criteria (17.3). The selection of required data from the file of result of search will be taken place in accordance with the priority of criteria of selection. It is necessary to notice, the size of the file of results of search will decrease as a result of selection.

The Web site of the system of global electronic job market defines digital codes of each activated criterion of selection. The Web site of the system of global electronic job market defines also, to which field (or column) of the file of results of search relates each from activated criterion of selection. Then, the Web site of the system of global electronic job market prepares a query for selection of desired information from the file of results of search on the basis of defined data.

The selection of data from the file of results of search (FIG. 17) on the basis of the criteria defined by the user comprises the following combination of steps.

First step of selection is selection of data from the file of results of search on the basis of a criterion, having first priority (17.4). This step of selection comprises in turn the following combination of steps. First step is a comparison of digital code of the criterion, having first priority, with digital codes of a corresponding field of the file of results of search in all rows of the file. The corresponding field of the file of results of search has been defined by the Web site of the system of global electronic job market on the basis of name of the criterion, having first priority. Second step is recording in a table of result of selection at this step of all rows of the file of results of search, where the digital code of the criterion, having first priority, coincides with digital codes of the of corresponding field of the file of results of search. Third step is storing of the table of result of selection at this step (17.5) on the host server of the system of global electronic job market. The table of result of selection at this step is smaller than the file of results of search. This means that the table of result of selection at this step has smaller number of rows than the file of results of search.

Second step of selection is selection of data from the table of result of selection at previous step on the basis of the criterion, having second priority (17.6). This step of selection comprises in turn the following combination of steps. First step is a comparison of a digital code of the criterion, having second priority, with digital codes of a corresponding field of the table of result of selection at previous step in all rows of the table. The corresponding field of the table has been defined by the Web site of the system of global electronic job market on the basis of name of the criterion, having second priority. Second step is recording in a table of result of selection at this step of all rows of the table of result of selection at previous step, where the digital code of the criterion, having second priority, coincides with digital codes of the of corresponding field of table of result of selection at previous step. Third step is storing of the table of result of selection at this step (17.7) on the host server of the system of global electronic job market, where the table of result of selection at this step is smaller than the table of result of selection at previous step.

The next step of selection repeats with the criterion, having third priority (17.8, 17.9) and so on to criterion, having last priority.

Then, the system of global electronic job market prepares a file of results of selection on the basis of last table of selection (17.10). The file of results of selection is smaller than the file of results of search. This means that the file of results of selection has smaller number of rows than the file of results of search. The system of global electronic job market provides an access to this file for the user of the system of global electronic job market.

After that the user can do an analysis of the file of results of selection (17.11).

Feature of algorithm of selection is, that criteria of selection are inserted by the user in the form (FIG. 16) from the same tables of the database, from which the data have been inserted by users in forms. The structure of the file of results of selection represents a full copy of structure of the corresponding table of the database. Hence, codes of criteria of selection and the data located in corresponding columns of the file of result of search are data having identical structure. The result of selection by this or that criterion will be complete and unequivocal. That is, the information which completely coincides with criterions of selection will get to result of selection only. No other data will get to result of selection. Selection of data will be full, that is, all data corresponding to criterions of selection, which are available at the moment in the file of results of search, will get to result of selection.

After the analysis of the file of results of selection the jobseeker can get a list of more acceptable variants of employment. And after the analysis of the file of results of selection the employer can get a list of more acceptable candidates for employment.

Figure 20:
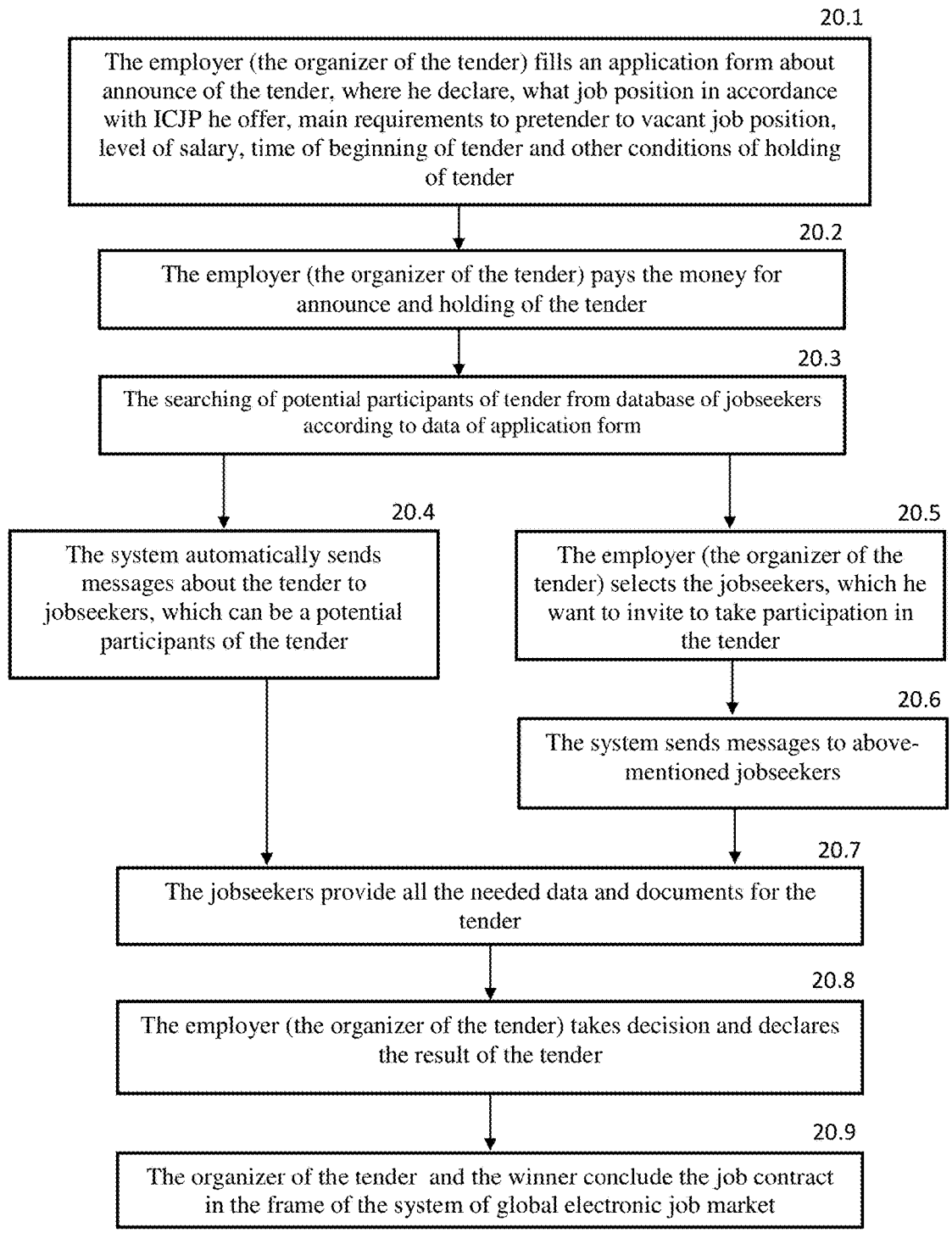
FIG. 20 shows a detailed description of the process of a competition for job vacancies (a tender).

For acceleration of procedure of a choice of applicants for a vacant job position, the employer can declare within the limits of system of the global electronic job market competition for vacant job position (tender) (FIG. 20). For the competition announcement for a vacant position the employer fills the special form (20.1), in which he inserts the name of the company and the address of the company, the name of an offered job position from the International Classification of Job Positions, the name of a required speciality and qualification from the International Classification of Specialities. By means of popup menus or popup lists, the employer inserts in the form the name of the group of countries or the name of country, where the company of the employer is situated, according to the table of groups of countries or the table of countries, a level of the offered salary, an experience of work, which a candidate for the vacant job position should have, an educational level, a name of the scientific degree, which a candidate for the vacant job position should possess, a type of work, data about languages, which a candidate should know, desirable age of a candidate, if this has interest for the employer, a gender of a candidate for the vacant job position, if this has for the employer any value.

Besides, the employer inserts in the specified form the additional requirements to the applicant for the vacant position, conditions of carrying out of competition, time of the beginning of competition, time of the termination of reception of demanded documents, the list of documents which the applicant for the vacant job position should give to organizer of competition, time of the announcement of results of competition.

The organizer of the tender brings a payment for the announcement and holding of the competition for vacant job position within the limits of system of global electronic job market (20.2).

Then the system of the global electronic job market makes searching and selection of possible candidates from the database of jobseekers according to the data inserted by the employer in the application form about the announcement of the tender, specified above (20.3).

The employer (the organizer of the tender) can take the offer of system of the global electronic job market about automatic dispatch of letters to candidates for the vacant job position (20.4), which list has been received as a result of search. In this case the system of the global electronic job market automatically forms the letters on the basis of data, which the employer has inserted in an application form about the announcement of the tender, and then dispatches these letters to candidates for the vacant job position.

The employer (the organizer of the tender) can consider the list, received as a result of search, himself, and choose suitable candidates for participation in the tender (20.5). In this case the system of a global electronic job market automatically forms the letter on the basis of data which the employer has inserted in the application form about the announcement of the tender, and dispatches the letters, to the chosen by employer candidates (20.6).

Candidates for a vacant position send all necessary documents to the organizer of the tender (20.7).

The organizer of the tender carries out the analysis of the received documents from applicants for a vacant position. The organizer of the tender can organize a meeting with participants of the tender during holding the competition, can hold an interview and tests with them, The organizer of the tender chooses the suitable candidate and declares results of competition by the publication of this result on any special page of the Web site of system of the global electronic job market, accessible only for participants of competition (20.8).

As a result of carrying out of the tender, the organizer and the winner of the tender conclude the contract within the limits of system of the global electronic job market (20.9).

Thus, the holding of the competition for vacant job position (tender) by the employer, as the organizer of the tender, in the frame of the system of global electronic job market in the Internet, comprises the following combination of steps.

First step is the filling of the application form for an announcement of the tender, where the employer informs jobseekers about the tender and declares demands to a candidate for the offered (vacant) job position. The application form comprises: a name of a company of the employer; an address of a company of the employer; a name of offered job position from the International Classification of Job Positions; a name of a speciality and qualification, which are needed for offered (vacant) job position, from the International Classification of Specialities; a name of a group of countries or a name of country, where the company of the employer is situated, according to the table of groups of countries or the table of countries; a level of the offered salary; an experience of work, which the candidate for a vacant job position should have; a desirable educational level of the candidate for the vacant job position; a name of a scientific degree, which the candidate for the vacant position should possess, if this has interest for the employer; a type of work; a data about languages, which the candidate should know; desirable age of the candidate, if this has interest for the employer; a gender of the candidate for the vacant job position, if this has for the employer any value; an additional requirements to the candidate for the vacant job position; conditions of carrying out of the competition; a time of a termination of reception of demanded documents; a list of documents, which the candidate for the vacant job position should give to organizers of the competition; starting time of the tender; and time of the announcement of results of the tender.

Second step is the payment of a fee for the announcement and holding of the competition for vacant job position in the frame of the system of global electronic job market.

Third step is the searching of potential participants of tender in accordance with the application form for the announcement of the tender from the database of jobseekers. The searching comprises the following combination of steps. The system of global electronic job market makes an automatic preparation of a request for searching of information about needed employees by the Web site of the system of global electronic job market on the basis of the name of the required speciality, the name of the offered job position and the name of group of countries or the name of country, where the company of the employer is situated. Then, the system of global electronic job market makes an automatic searching of needed employees according to the request for searching of information about needed employees in the table of information about jobseekers of the database of information about jobseekers. As a result, the system of global electronic job market creates a list of potential participants of the tender.

Fourth step is the notification of potential participants about the tender, which is carried out or by automatic sending of messages about the tender to all potential participants according to the list of found potential participants, or by sending of messages to the potential participants chosen by the organizer of the tender from the list of potential participants.

Fifth step is the collection of the demanded documents from potential participants of the tender by the organizer of the tender and analysis of received documents from potential participants of the tender by the organizer of the tender.

Sixth step is the holding of the competition for declared vacant job position on the basis of data of participants of the tender by the organizer of the tender.

Seventh step is the declaration of a result of the tender by means of publishing this result on any special page of the system of global electronic job market exclusively available for the participants of the tender.

Eighth step is the conclusion of a job contract in the frame of the system of global electronic job market between an organizer and a winner of the tender.

Distinctive feature of carrying out of competition for a vacant job position (tender) within the limits of system of the global electronic job market is that:

a) the system of the global electronic job market forms the list of possible candidates on participation in the tender as a result of searching and selection on the basis of the data, inserted by the employer in an application form about the announcement of the tender;

b) only the candidates corresponding to request of the organizer of the tender are invited to competition, that essentially increases probability of their participation in competition, in comparison with the usual announcement of competition, for example, in the newspaper or on a company site;

c) automatic formation of the letter for dispatch to candidates on the basis of data which the employer has inserted in an application form about the tender announcement;

d) possibility of automatic dispatch of letters to candidates for the vacant job position, which list has been received as a result of search;

e) essential acceleration of procedure of competition.

Figure 18:
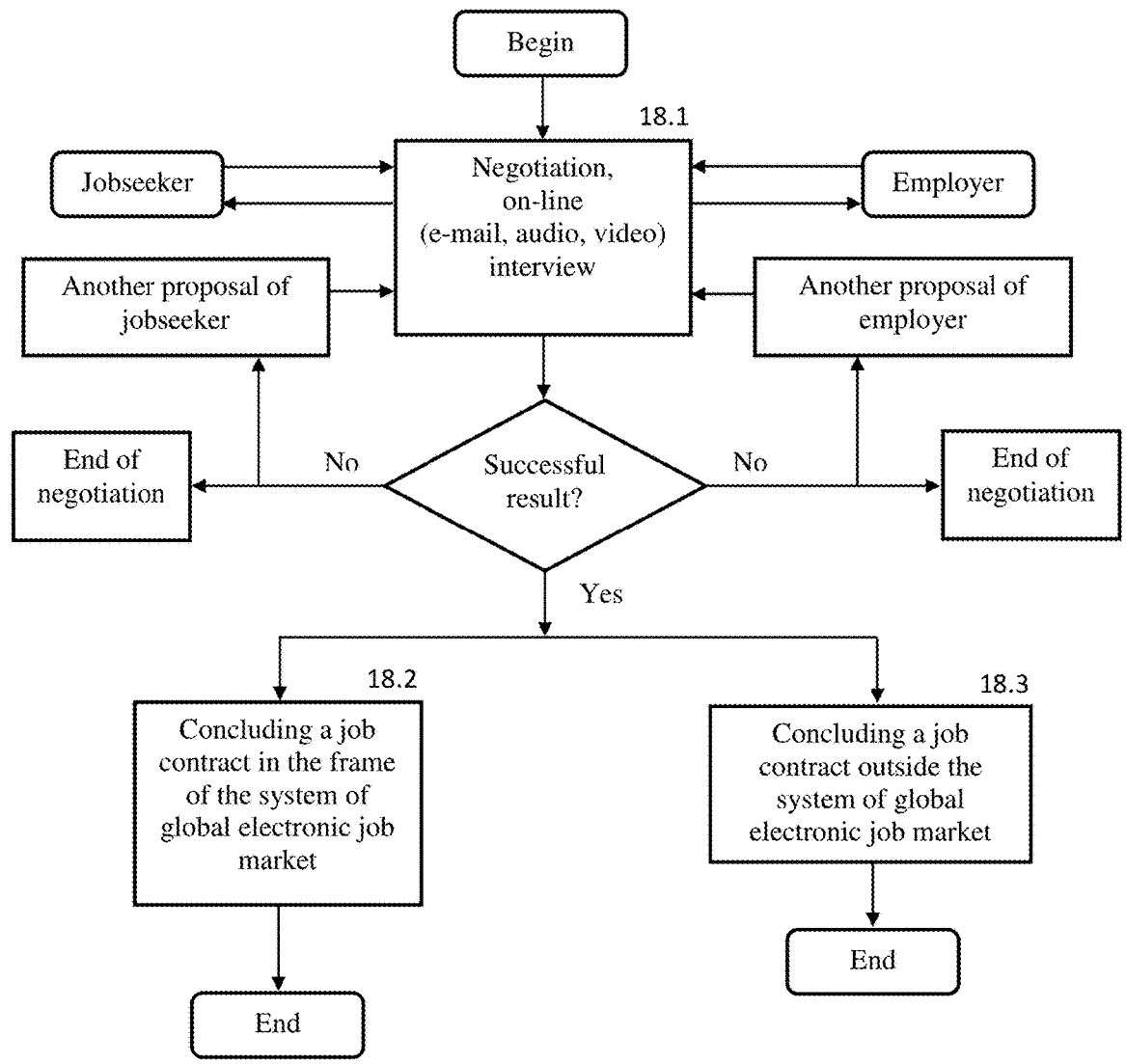
FIG. 18 shows a detailed description of the transaction block.

The system of the global electronic job market can propose to organize a holding of a transaction procedure as an additional service of the system. FIG. 18 describes the transaction block. Upon definition of potential partners in the system of global job market, users can engage into negotiations on a possible conclusion of job contracts (18.1). They can negotiate on-line using provided audio or video services or internal e-mail of the system. Audio or video can be conducted through a special window in the system. Negotiations can be conducted as an exchange of text or e-mail messages, or via telephone. If the result of negotiations is successful, the parties can conclude a job contract. The job contract can be concluded in the frame of the system (18.2) or outside the system (18.3). If the job contract is concluded in the frame of the system, the system records a debt to one of the partners, who will be named in the contract as the payer of the fee to the system.

Figure 19:
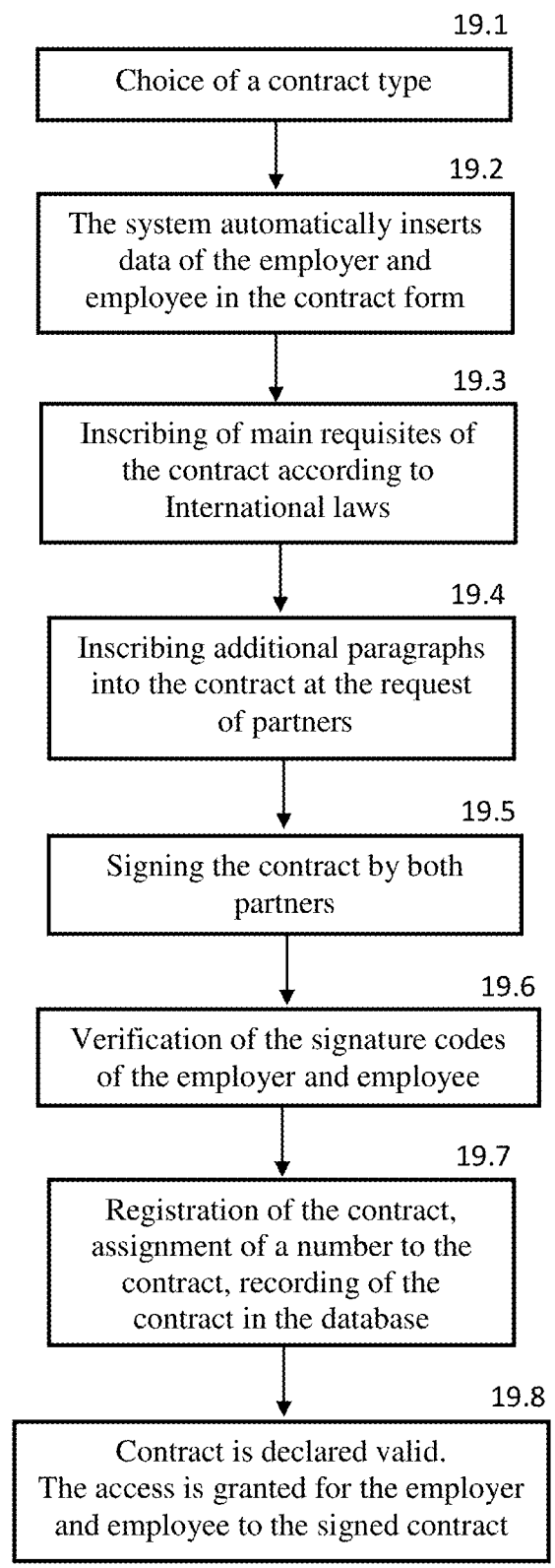
FIG. 19 shows a detailed description of the process of concluding of job contracts.

FIG. 19 describes a process of preparing and concluding the job contract. The employer and the jobseeker, which decide to conclude a job contract in the frame of system of global job market, are able to choose a suitable type of the contract (19.1). The system will propose different kinds of standard job contracts. Standard job contracts differ depending on: who will sign a contract on the employer side, speciality of the employee, period of employment (for a time or permanent) and so on. The standard job contracts will be prepared according to the International legal regulations. The system automatically inserts data about the employer and the employee in the contract form (19.2). The standard job contracts include the main requisites, which are needed to be inscribed in the contract, for example: a duration of the contract, data about payment for labour (19.3). The contract will not be registered in the system until the main data is inscribed. After that the partners can introduce additional paragraphs into the contract, if they wish so (19.4). The system provides recommendations of lawyers of the system about additional paragraphs of a job contract. Then the partners have to decide who will pay the fee to the system, and mention that in the contract. After that the partners insert electronic signatures into the contract through entering corresponding codes in the special fields (19.5). The employer, having a seal according to the article of associations, must input the seal code in the determined place. After that the system verifies the introduced signature and seal codes (19.6). If all the data is valid, the system places scanned signatures of each party and seal of each party into the determined places of the contract. After that the system registers the contract, assigns the number to the contract and records the contract into the database (19.7). After that the contract registration is declared valid (19.8). The both parties are granted an access to the contract in order to be able to print it, store it in another location and so on.

The contract will be registered automatically only in case, if it was signed by the both parties, so none of the parties can reject the fact, that the contract was signed. This procedure increases the reliability of the contract. The system can confirm the conclusion of the contract in case of a conflict situation.

Figure 21:
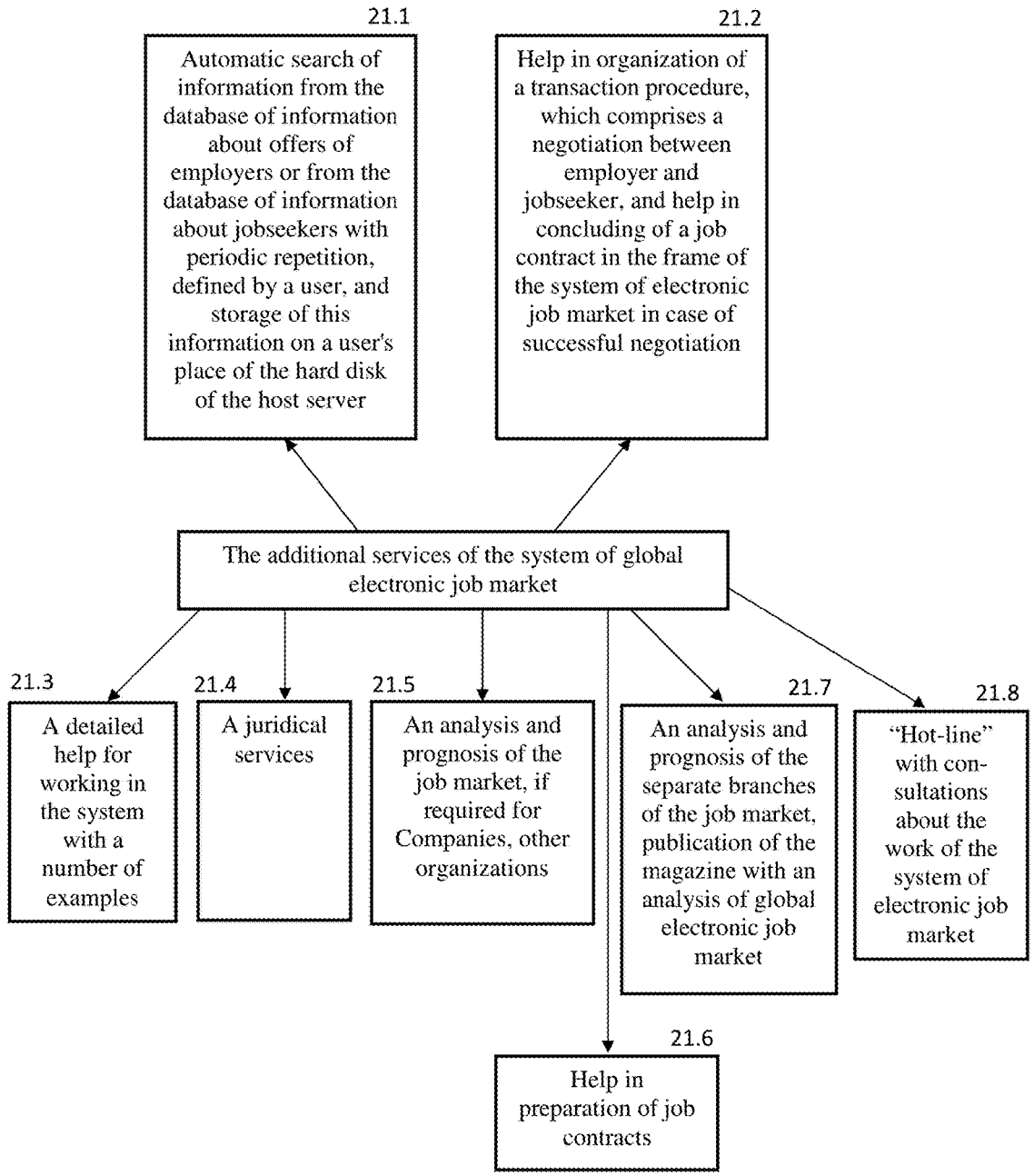
FIG. 21 shows additional services of the system of global job market.

FIG. 21 describes additional services of the system of global electronic job market. These services include:

an automatic search of information from the database of information about offers of employers in accordance with algorithm of searching of information about job vacancies according to the request of jobseeker or from the database of information about jobseekers in accordance with algorithm of searching of information about needed employees according to the request of employer with periodic repetition, defined by a user, and storage of this information on a user's place of the hard disk of the host server of the system of global electronic job market, and providing of an access for user to this information on the page of the user on the Web site of the system of global electronic job market (21.1);

help in organization of a transaction procedure (21.2), which comprises a negotiation between employer and jobseeker, and help in concluding of a job contract in the frame of the system of electronic job market in case of successful negotiation, where the concluding of job contract in the frame of the system of electronic job market comprises a combination of steps: choosing a standard form of a job contract proposed by the system of global electronic job market; automatic filling of data about employer and jobseeker into the contract; filling main requisites into the contract according to International legal regulations; filling additional paragraphs into the contract, if the users desire so; inserting of electronic signatures in the contract through entering corresponding codes in special fields of the contract by partners of concluding of the contract; inserting of codes of electronic seal in a determined place of the contract by users; verifying codes of the electronic signature and the seal; automatic setting scanned signatures and seals of both parties in a specified location of the contract; automatic registration of the contract and storing the contract in the database of confidential information without a possibility to insert any one-sided changes into the contract; and making the contract accessible for every party;

a detailed help for working in the system of global electronic job market with a number of examples (21.3);

juridical services, connected with contractual relationship between users, in the frame of the system of global electronic job market (21.4);

an analysis and prognosis of the job market, if required for Companies or other organizations 21.5);

help in preparation of a job contract (21.6);

an analysis and prognosis of separate branches of the job market (21.7);

a publication of an electronic magazine with an analysis of the global electronic job market (21.7); and "Hot-line" with consultations about the work of the system of electronic job market (21.8).

The system of global electronic job market can propose to carry out the automatic search of information from the database of information about offers of employers in accordance with algorithm of searching of information about job vacancies according to the request of jobseeker or from the database of information about jobseekers in accordance with algorithm of searching of information about needed employees according to the request of employer with periodic repetition, defined by a user. If the user wants to use this service, the user must apply special form and prepare the request for searching, and define the periodic repetition of fulfillment of automatic search. The system of global electronic job market will carries out automatic search with help of special program of automatic search. The system of global electronic job market will store received information on a user's place of the hard disk of the host server of the system of global electronic job market, and provide an access for user to this information on the page of the user on the Web site of the system of global electronic job market.

The system of global electronic job market can provide the detailed help for working in the system. The system can provide detailed instructions for work in different sections of the Web site of the system, for example: an instruction for registration in the system, an instruction for searching of trade partners, an instruction for working with the file of result of search and so on. The system can show examples: how to apply the registration form, how to fill the form of request by the jobseeker for searching of information about job vacancies, how to fill the form of request by the employer for searching of information about needed employees, how to make the sorting of data from the file of results of search, how to make the selection from the file of results of search, how to organize the tender and so on.

The system of global electronic job market can provide the juridical services, which can include: a help in preparation of job contracts, a help in validation of documents about education in other countries and validations of other demanded documents, a help for users of the system of electronic job market in case of infringement of job contract and so on.

The system of global electronic job market can provide a help in preparation of a job contract. Jurists of the system can recommend standard form of the contract, which is fit for concrete conditions. Jurists of the system can give explanations and advises for any paragraphs of the contract.

The system of global electronic job market can provide the analysis and prognosis of the job market, if required for Companies or other organizations. The system of electronic job market can have unique data for any period of operation of the system, for example for current year: about demands of the job markets, about direction of movement of labor force, about deficiency of specialists in any regions of country or in any branches of industry, about overage of labor force in any regions of country or in any branches of industry and so on. These data can give possibility to make real analysis of job market. These data can give possibility to make prognosis of development of job market with good level of probability, because the prognosis will be based on the real data. Analysis and prognosis can concern of separate regions of country, separate branches of industry, or country, or industry in general.

The system of global electronic job market will publish in the Web site of the system the electronic magazine with an analysis of the global electronic job market. The magazine of the system of global electronic job market will be interesting for specialists in field of job market, for scientists and for government officials, because the system of electronic job market will have the real data about job market.

The system of global electronic job market will provide "Hot-line" with consultations about the work of the system of electronic job market. "Hot-line" will provide urgent help and urgent consultations about the work of the Web site of the system of electronic job market. "Hot-line" of the system of global electronic job market can give answers in format "The list of mostly popular questions and answers". "Hot-line" of the system of global electronic job market can operate in form of e-mail contact with specialists of the system.

What is claimed is:

1. A method of operation of a system of global electronic job market in the Internet, intended for searching of job vacancies by jobseekers and for searching of employees by employers, wherein the system of global electronic job market represents a complex of hardware and software, which comprises a combination of properties:

1) the system of global electronic job market comprises a host server, which, in turn, comprises: a Web site of the system of global electronic job market with programs of searching, with help of which jobseekers can search job vacancies, and employers can search employees, and physical media of storage of information, where databases of the system of global electronic job market are stored, and where said databases at least comprise:

a) a group of related data tables, representing an International Classification of Specialities;
b) a group of related data tables, representing an International Classification of Job Positions;
c) a relational database of information about jobseekers, which represents a group of related tables of data, where a group of fields, in which information about specialities is contained, represents foreign keys, related with primary keys of all tables of the International Classification of Specialities, and where a group of fields, in which information about job positions is contained, represents foreign keys, related with primary keys of all tables of the International Classification of Job Positions; and
d) a relational database of information about offers of employers, which represents a group of related tables of data, where a group of fields, in which information about specialities is contained, represents foreign keys, related with primary keys of all tables of the International Classification of Specialities, and where a group of fields, in which information about job positions is contained, represents foreign keys, related with primary keys of all tables of the International Classification of Job Positions; and 2) the host server of the system of global electronic job market connects with numerous computers of jobseekers and with numerous computers of employers by means of the Internet, and the system of global electronic job market communicates with these computers with help of the Web site of the host server of the system of global electronic job market and with help of the Internet;

and where the method of operating of the system of global electronic job market, intended for searching of job vacancies by jobseekers and for searching of employees by employers, where the system of global electronic job market possesses by said combination of properties, comprises at least a combination of steps:
a) creating of the group of related data tables of the International Classification of Specialities, where the International Classification of Specialities represents by itself a tree-like structure with names and corresponding codes of branches and sub-branches of main kinds of activity of person, where final branches of the tree represent names of specialities, and where primary keys of all tables of the International Classification of Specialities are presented in a form of digital codes;
b) creating of the group of related data tables of the International Classification of Job Positions, where the International Classification of Job Positions represents by itself a tree-like structure with names and corresponding codes of basic groups and subgroups of job positions, where final branches of the tree represent names of job positions, and where primary keys of all tables of the International Classification of Job Positions are presented in a form of digital codes;
c) creating of a group of related data tables, which comprises:
(1) a table of education, which comprises names of level of education and primary keys of this table,
(2) a table of scientific degrees, which comprises names of scientific degrees and primary keys of this table,
(3) a table of work experience, which comprises gradations of work experience in years and primary keys of this table,
(4) a group of tables of knowledge of languages, which comprises a table of languages with names of languages and table of level of knowledge of languages with names of level of knowledge of languages and primary keys of these tables,
(5) a table of salary, which comprises gradation of salary in sums and primary keys of this table,
(6) a table of types of work, which comprises names of types of work and primary keys of this table,
(7) a table of age, which comprises gradation of age in years and primary keys of this table,
(8) a table of genders, which comprises names of genders and primary keys of this table, and
(9) a group of tables of groups of countries, countries, regions, and cities, which comprises:
a group of tables of groups of countries of the world, which, in turn, comprises: a table of continents, a table of groups of countries,
a table of countries with names of world countries,
a tables of regions of countries with names of these regions, and
a tables of cities of countries with names of cities
and primary keys of these tables;
and where all primary keys in these tables of data are presented in a form of digital codes;
d) registration of a user, comprising steps:
(1) filling of a registration form, which comprises items:
(a) status of user from point of view of the system of global electronic job market: a jobseeker, or an employer,
(b) social status of user: a private person, or a company, or an employment agency,
(c) name of user: a first name and a family name of the private person, or a name of the company, or a name of the employment agency,
(d) address of user: an address of the private person, or an address of the company, or an address of the employment agency, and
(e) e-mail address of user: e-mail address of the private person, or e-mail address of the company, or e-mail address of the employment agency,
(2) creation of a temporary file on the hard disks of the main server for a new user, and deleting of this file in case of failure to pay a registration fee in the specified period,
(3) payment of the registration fee by the private person, by the company or by the employment agency,
(4) creation of a domain of user in case of payment of the registration fee by a user, where the domain of user comprises: a place for the user on the hard disk of the host server of the system of global electronic job market and a page of the user on the Web site of the system of global electronic job market, and
(5) activation of user, definition of a registration number for him, access to a work with system;
e) creating of a database of confidential information, where the database of confidential information comprises:
(1) addresses of private persons, who will sign job contracts in a frame of the system of global job market,
(2) samples of scanned signatures and electronic signatures of private persons, who will sign job contracts in the frame of the system of global job market, where electronic signatures of private persons represent numeric alphabetic codes, (3) names and job positions of official representatives of companies, who will sign job contracts on behalf of the company,
(4) samples of official scanned signatures and electronic signatures of official representatives of companies, who will sign job contracts on behalf of the company, where electronic signatures of official representatives of companies represent numeric alphabetic codes,
(5) samples of scanned prints of seals and electronic seals, in case, if a user has seal, where electronic seals represent numeric alphabetic codes, and
(6) job contracts, which are concluded and registered in the frame of the system of global job market;

f) forming of the relational database of information about jobseekers on the basis of data, provided by themselves, and wherein a table of information about jobseekers of said database comprises fields of information:
(1) a primary key of the table of information about jobseekers,
(2) a first name, in a text format,
(3) a family name, in a text format,
(4) a group of fields of speciality, characterizing a speciality, with foreign keys of all tables of the International Classification of Specialities,
(5) a field of qualification with a foreign key of qualification from a table of qualification of the International Classification of Specialities,
(6) a field of level of education with a foreign key of the table of education,
(7) a field of scientific degree with a foreign key of the table of scientific degrees,
(8) a field of work experience with a foreign key of the table of work experience,
(9) a group of fields of knowledge of languages with foreign keys of tables of knowledge of languages,
(10) a group of fields of job position, characterizing a desired job position, with foreign keys of all tables of the International Classification of Job Positions,
(11) a field of desired salary with a foreign key of the table of salary,
(12) a field of desired type of work with a foreign key of the table of type of work,
(13) a field of age with a foreign key of the table of age,
(14) a field of gender with a foreign key of the table of genders,
(15) a group of fields of groups of countries, country, region, and city with foreign keys of tables of continents, of group of countries, of countries, of regions, and of cities,
(16) CV in a text format, and
(17) e-mail address, in a text format;
and where all foreign keys of fields from (4) to (15) in the table of information about jobseekers are presented in a form of digital codes;

g) forming of the relational database of information about offers of employers on the basis of data provided by themselves, and wherein a table of information about offers of employers of said database comprises fields of information:
(1) a primary key of the table of information about offers of employers,
(2) a name of a company, in a text format,
(3) an address of a company, in a text format,
(4) a group of fields of job position, characterizing an offered job position, with foreign keys of all tables of the International Classification of Job Positions,
(5) a group of fields of speciality, characterizing a required speciality, with foreign keys of all tables of the International Classification of Specialities,
(6) a field of qualification with a foreign key of qualification of needed employee from a table of qualification of the International Classification of Specialities,
(7) a field of desired work experience with a foreign key of the table of work experience,
(8) a field of desired educational level with a foreign key of the table of educational level,
(9) a field of scientific degree with a foreign key of the table of scientific degrees,
(10) a group of fields of knowledge of languages with foreign keys of tables of knowledge of languages,
(11) a field of offered salary with a foreign key of the table of salary,
(12) a field of type of work with a foreign key of the table of type of work,
(13) a field of desired age with a foreign key of the table of age,
(14) a field of desired gender with a foreign key of the table of genders,
(15) a group of fields of groups of countries, country, region, and city with foreign keys of tables of continents, of group of countries, of countries, of regions, and of cities,
(16) additional data about company, in a text format, and
(17) a detailed description of offered job position, in a text format;
and where all foreign keys of fields from (4) to (15) in the table of information about offers of employers are presented in a form of digital codes;

h) forming a request for searching of information about job vacancies by a jobseeker, which comprises a combination of steps:
(1) filling of a form of request by the jobseeker, which comprises:
(a) a name of branch or sub-branch of kind of people activity, or a name of speciality of the jobseeker, where the jobseeker specifies the name of branch or sub-branch of kind of people activity, or the name of his speciality in the form of request in a text format according to the International Classification of Specialities,
(b) a name of subgroup of job positions or a name of desired job position, where the jobseeker specifies the name of subgroup of job positions or the name of desired job position in the form of request in a text format according to the International Classification of Job Positions, and
(c) a name group of countries or a country, where the jobseeker wants to find a job, and where the jobseeker specifies the name of group of countries or the country in the form of request in a text format according to the table of group of countries or of the table of countries;
and
(2) forming of the request for searching of information about job vacancies with help of the Web site of the system of global electronic job market on the basis of data, presented in the form of request by the jobseeker, and where the request for searching comprises:

(a) a digital code, which is related with corresponding field of group of fields of speciality of the table of information about offers of employers of the database of information about offers of employers, where this field corresponds or to the branch of kind of people activity, or to the sub-branch of kind of people activity, or to the speciality, which was presented in the form of request by the jobseeker, and where the digital code is foreign key of correspondent table of the International Classification of Specialities, (b) a digital code, which is related with corresponding field of group of fields of job position of the table of information about offers of employers of the database of information about offers of employers, where this field corresponds or to the subgroup of job positions, or to the desired job position of the jobseeker, which was presented in the form of request by the jobseeker, and where the digital code is foreign key of correspondent table of the International Classification of Job Positions, and (c) a digital code, which is related with corresponding field of group of fields of groups of countries, country, region, and city of the table of information about offers of employers of the database of information about offers of employers, where this field corresponds or to desired group of countries, or to the country, where the jobseeker wants to find a job, which was presented in the form of request by the jobseeker, and where the digital code is foreign key of correspondent table of group of countries or of the table of countries;

i) forming a request for searching of information about needed employees by an employer, which comprises a combination of steps:

(1) filling of a form of request by the employer, which comprises:

(a) a name of required branch or sub-branch of kind of people activity, or a required speciality of employee for an offered job position, where the employer specifies the name of required branch or sub-branch of kind of people activity, or the required speciality of employee for the offered job position in the form of request, in a text format, according to the International Classification of Specialities, (b) a name of subgroup of job positions, or a name of an offered job position, where the employer specifies the name of subgroup of job positions, or the name of the offered job position in the form of request, in a text format, according to the International Classification of Job Positions, and (c) a name of group of countries or a name of country, where a company of the employer is situated, and where the employer specifies the name of group of countries or the name of country in the form of request, in a text format, according to the table of group of countries or the table of countries; and (2) forming of the request for searching of information about needed employees with help of the Web site of the system of global electronic job market on the basis of data, presented in the form of request by the employer, and where the request for searching comprises:

(a) a digital code, which is related with corresponding field of group of fields of speciality of the table of information about jobseekers of the database of information about jobseekers, where this field corresponds or to the branch of kind of people activity, or to the sub-branch of kind of people activity, or to the required speciality of employee, which was presented in the form of request by the employer, and where the digital code is foreign key of correspondent table of the International Classification of Specialities, (b) a digital code, which is related with corresponding field of group of fields of job position of the table of information about jobseekers of the database of information about jobseekers, where this field corresponds or to the subgroup of job positions, or to the offered job position, which was presented in the form of request by the employer, and where the digital code is foreign key of correspondent table of the International Classification of Job Positions, and (c) a digital code, which is related with corresponding field of group of fields of groups of countries, country, region, and city of the table of information about jobseekers of the database of information about jobseekers, where this field corresponds or to group of countries, or to the country, where the company of the employer is situated, which was presented in the form of request by the employer, and where the digital code is foreign key of correspondent table of group of countries or of the table of countries;

j) searching of information about job vacancies according to the request of jobseeker from the table of information about offers of employers of the database of information about offers of employers, where searching comprises a combination of steps:

(1) preparation of a query by the Web site of the system of global electronic job market for selection of information from the database of information about offers of employers on the basis of the request of jobseeker, (2) selection of corresponding information from the table of information about offers of employers of the database of information about offers of employers, where selection comprises a combination of steps:

(a) comparison of digital code of the request for searching of information about job vacancies with digital codes of a corresponding field of group of fields of speciality of the table of information about offers of employers in all rows of the table, where the corresponding field of group of fields of speciality of the table has been defined by the Web site of the system of global electronic job market in the request for searching of information about job vacancies, (b) recording in a first table of results of search of all rows of the table of information about offers of employers, where the digital code of the request for searching of information about job vacancies coincides with digital codes of the of corresponding field of group of fields of speciality of the table of information about offers of employers, (c) comparison of digital code of the request for searching of information about job vacancies with digital codes of a corresponding field of group of fields of job positions of the first table of results of search in all rows of the table, where the corresponding field of group of fields of job positions of the table has been defined by the Web site of the system of global electronic job market in the request for searching of information about job vacancies, (d) recording in a second table of results of search of all rows of the first table of results of search, where the digital code of the request for searching of information about job vacancies coincides with digital codes of the corresponding field of group of fields of job positions of the first table of results of search,
(e) comparison of a digital code of the request for searching of information about job vacancies with digital codes of a corresponding field of group of fields of groups of countries or countries of the second table of results of search in all rows of the table, where the corresponding field of group of fields of groups of countries or countries of the table have been defined by the Web site of the system of global electronic job market in the request for searching of information about job vacancies, and
(f) recording in a third table of results of search of all rows of the second table of results of search, where the digital code of the request for searching of information about job vacancies coincides with digital codes of the of corresponding field of group of fields of groups of countries or countries of the second table of results of search, and
(3) forming a file of results of search of information about job vacancies according to the request of jobseeker, where the file of results of search is formed on the basis of the third table of result of search, and where the file of results of search comprises a combination of properties:
(a) a structure of the file of results of search completely corresponds to a structure of the table of information about offers of employers of the database of information about offers of employers, the file of results of search has exactly the same fields that the table of information about offers of employers,
(b) the file of results of search of job vacancies completely corresponds to the request of jobseeker, because the digital codes of the request of jobseeker and digital codes of corresponding fields of the table of information about offers of employers have been written from one sources, from the related data tables of the system of global electronic job market, and as a result, only information, which is coincided with the request of jobseeker, can be included in the file of results of search, and
(c) the file of results of search of information about job vacancies is accessible for the jobseeker and can be saved on a computer of the jobseeker;
k) searching of information about needed employees according to the request of employer from the table of information about jobseekers of the database of information about jobseekers, where searching comprises a combination of steps:
(1) preparation of a query by the Web site of the system of global electronic job market for selection of information from the database of information about jobseekers on the basis of the request of employer,
(2) selection of corresponding information from the table of information about jobseekers of the database of information about jobseekers, where selection comprises a combination of steps:
(a) comparison of digital code of the request of employer with digital codes of a corresponding field of group of fields of speciality of the table of information about jobseekers in all rows of the table, where the corresponding field of group of fields of speciality of the table has been defined by the Web site of the system of global electronic job market in the request of employer,
(b) recording in a first table of results of search of all rows of the table of information about jobseekers, where the digital code of the request of employer coincides with digital codes of the of corresponding field of group of fields of speciality of the table of information about jobseekers,
(c) comparison of digital code of the request of employer with digital codes of a corresponding field of group of fields of job positions of the first table of results of search in all rows of the table, where the corresponding field of group of fields of job positions of the table has been defined by the Web site of the system of global electronic job market in the request of employer,
(d) recording in a second table of results of search of all rows of the first table of results of search, where the digital code of the request of employer coincides with digital codes of the corresponding field of group of fields of job positions of the first table of results of search,
(e) comparison of digital code of the request of employer with digital codes of a corresponding field of group of fields of groups of countries or countries of the second table of results of search in all rows of the table, where the corresponding field of group of fields of groups of countries or countries of the table have been defined by the Web site of the system of global electronic job market in the request of the employer, and
(f) recording in a third table of results of search of all rows of the second table of results of search, where the digital code of the request of employer coincides with digital codes of the corresponding field of group of fields of groups of countries or countries of the second table of results of search,
(g) and
(3) forming a file of results of search of information about needed employees according to the request of employer, where the file of results of search is formed on the basis of the third table of result of search, and where the file of results of search comprises a combination of properties:
(a) a structure of the file of results of search completely corresponds to a structure of the table of information about jobseekers of the database of information about jobseekers, the file of results of search has exactly the same fields that the table of information about jobseekers,
(b) the file of results of search of information about needed employees completely corresponds to the request of employer, because the digital codes of the request of employer and digital codes of corresponding fields of the table information about jobseekers have been written from one sources, from the related data tables of the system of global electronic job market, and as a result, only information, which is coincided with the request of employer, can be included in the file of results of search, and
(c) the file of results of search of information about needed employees is accessible for the employer and can be saved on a computer of the employer;
l) sorting of data from the file of results of search of information about job vacancies or from the file of results of search of information about needed employees on the basis of one of a criteria of sorting, selected by a user, where criteria of sorting comprise:
- (1) a job position, in case, if the search was made by the user on the basis of subgroup of job positions,
- (2) a country, a region and a city,
- (3) a qualification,
- (4) a salary,
- (5) an experience of work,
- (6) a type of work,
- (7) a level of education,
- (8) a scientific degree,
- (9) a level of knowledge of languages,
- (10) an age, or
- (11) a gender;

and where size of the file of results of search doesn't change after sorting;
- m) selection of data from the file of results of search of information about job vacancies by a jobseeker or selection of data from the file of results of search of information about needed employees by an employer;
- n) holding of a competition for a vacant job position (tender) by an employer; and
- o) providing of additional services by the system of global electronic job market in the Internet, where the additional service comprises:
  - (1) an automatic search of information from the database of information about offers of employers in accordance with algorithm of searching of information about job vacancies according to the request of jobseeker or from the database of information about jobseekers in accordance with algorithm of searching of information about needed employees according to the request of employer with periodic repetition, defined by a user, and storage of this information on a user's place of the hard disk of the host server of the system of global electronic job market, and providing of an access for user to this information on the page of the user on the Web site of the system of global electronic job market,
  - (2) help in organization of a transaction procedure, which comprises a negotiation between employer and jobseeker, and help in concluding of a job contract in the frame of the system of electronic job market in case of successful negotiation, where the concluding of job contract in the frame of the system of electronic job market comprises a combination of steps:
    - (a) choosing a standard form of a job contract, proposed by the system of global electronic job market,
    - (b) automatic filling data about employer and jobseeker into the contract,
    - (c) filling main requisites into the contract according to International legal regulations,
    - (d) filling additional paragraphs into the contract, if users desire so,
    - (e) inserting of electronic signatures in the contract through entering corresponding codes in special fields of the contract by partners of concluding of the contract,
    - (f) inserting of codes of electronic seal in a determined place of the contract by users,
    - (g) verification of codes of the electronic signature and the seal by the system of global electronic job market,
    - (h) automatic insertion of scanned signatures of both parties and of seals in a specified location of the contract,
    - (i) automatic registration of the contract and storing the contract in the database of confidential information without a possibility to insert any one-sided changes in the contract, and
    - (j) making the contract accessible for every party,
  - (3) a detailed help for working in the system of global electronic job market with a number of examples,
  - (4) juridical services, connected with contractual relationship between users, in the frame of the system of global electronic job market,
  - (5) an analysis and prognosis of the job market, if required for companies or other organizations,
  - (6) help in preparation of a job contract,
  - (7) an analysis and prognosis of separate branches of job market,
  - (8) publication of an electronic magazine with an analysis of global electronic job market, and
  - (9) "Hot-line" with consultations about a work of the system of global electronic job market.

2. The method according to claim 1, where selection of data from the file of results of search of information about job vacancies by a jobseeker or selection of data from the file of results of search of information about needed employees by an employer comprises a combination of steps:
- a) an activation of demanded criteria of selection from a list of criteria by a user of the system of global electronic job market (by a jobseeker or by an employer), which comprise:
  - (1) a job position, in case, if the search was made by user on the basis of subgroup of job positions,
  - (2) a country, a region and a city,
  - (3) a qualification,
  - (4) a salary;
  - (5) an experience of work;
  - (6) a type of work;
  - (7) a level of education;
  - (8) a scientific degree;
  - (9) a level of knowledge of languages;
  - (10) an age; and
  - (11) a gender;
- b) a choice of a name or of size of each activated criterion of selection, where names or sizes of each activated criterion of selection for the choice is given by Web site of the system of global electronic job market from the file of result of search;
- c) definition of a priority of each activated criterion of selection by the user;
- d) definition of digital codes of each activated criterion of selection by the Web site of the system of global electronic job market,
- e) definition, to which field (or column) of the file of results of search relates each from activated criterion of selection, by the Web site of the system of global electronic job market,
- f) selection of data from the file of results of search on the basis of the criteria defined by the user, where the selection comprises a combination of steps:
  - (1) selection of data from the file of results of search on the basis of the criterion, having first priority, where this selection comprises a combination of step:
    - (a) comparison of a digital code of the criterion, having first priority, with digital codes of a corresponding field of the file of results of search in all rows of the file, where the corresponding field of the file of results of search has been defined by the Web site of the system of global electronic job market on the basis of name of the criterion, having first priority,
- (b) recording in a table of result of selection at this step of all rows of the file of results of search, where the digital code of the criterion, having first priority, coincides with digital codes of the of corresponding field of the file of results of search, and
- (c) storing of the table of result of selection at this step on the host server of the system of global electronic job market, where the table of result of selection at this step is smaller than the file of results of search, (2) selection of data from the table of result of selection at previous step on the basis of the criterion, having second priority, where this selection comprises a combination of steps:
- a) comparison of a digital code of the criterion, having second priority, with digital codes of a corresponding field of the table of result of selection at previous step in all rows of the table, where the corresponding field of the table has been defined by the Web site of the system of global electronic job market on the basis of name of the criterion, having second priority,
- b) recording in a table of result of selection at this step of all rows of the table of result of selection at previous step, where the digital code of the criterion, having second priority, coincides with digital codes of the of corresponding field of table of result of selection at previous step, and
- c) storing of the table of result of selection at this step on the host server of the system of global electronic job market, where the table of result of selection at this step is smaller than the table of result of selection at previous step, (3) and so on to criterion, having last priority, and (4) preparation of a file of results of selection on the basis of last table of selection, where the file of result of selection is smaller than the file of results of search, and providing an access to this file for the user of the system of global electronic job market; and g) analysis of the file of results of selection by the user.

3. The method according to claim 1, wherein holding of a competition for a vacant job position (tender) by an employer, as an organizer of the tender, in a frame of the system of global electronic job market in the Internet, comprises a combination of steps:
- a) filling of an application form for an announcement of the tender, where the employer declares demands to a candidate for the offered (vacant) job position, where the application form comprises:
  - (1) a name of a company of the employer,
  - (2) an address of the company of the employer,
  - (3) a name of offered job position in accordance with the International Classification of Job Positions,
  - (4) a name of a speciality and qualification, which are needed for offered (vacant) job position, in accordance with the International Classification of Specialities,
  - (5) a name of a group of countries or a name of country, where the company of the employer is situated, according to the table of group of countries or the table of countries,
  - (6) a level of offered salary,
  - (7) an experience of work, which the candidate for the vacant job position should have,
  - (8) a desirable educational level of the candidate for the vacant job position,
  - (9) a name of a scientific degree, which the candidate for the vacant job position should possess, if this has interest for the employer,
  - (10) a type of work,
  - (11) a data about languages, which the candidate should know,
  - (12) desirable age of the candidate, if this has interest for the employer,
  - (13) a gender of the candidate for the vacant job position, if it has for the employer any value,
  - (14) an additional requirements to the candidate for the vacant job position,
  - (15) conditions of carrying out of the competition,
  - (16) a time of a termination of reception of demanded documents,
  - (17) a list of documents, which the candidate for the vacant job position should give to organizer of the competition,
  - (18) starting time of the tender, and
  - (19) time of announcement of results of the tender;
- b) payment of a fee for the announcement and holding of the competition for the vacant job position in the frame of the system of global electronic job market;
- c) searching of potential participants of tender, in accordance with the application form for an announcement of the tender, from the database of jobseekers, where searching comprises a combination of steps:
  - (1) automatic preparation of a request for searching of information about needed employees by the Web site of the system of global electronic job market on the basis of the name of the speciality, the name of the offered job position and the name of group of countries or the name of country, where the company of the employer is situated,
  - (2) automatic searching of needed employees according to the request for searching of information about needed employees in the table of information about jobseekers of the database of information about jobseekers, and
  - (3) forming a list of potential participants of the tender;
- d) notification of potential participants about the tender, which is carried out or by automatic sending of messages about the tender to all potential participants on the basis of the list of found potential participants, or by sending of messages to the potential participants chosen by the organizer of the tender from the list of potential participants;
- e) collection of demanded documents from potential participants of the tender by the organizer of the tender and analysis of received documents from potential participants of the tender by the organizer of the tender;
- f) holding of the competition for declared vacant job position on the basis of data of participants of the tender by the organizer of the tender;
- g) declaration of a result of the tender by means of publishing this result on any special page of the system of global electronic job market exclusively available for the participants of the tender; and
- h) conclusion of a job contract in the frame of the system of global electronic job market between the organizer and a winner of the tender.

* * * * *